US012718745B2

(12) United States Patent
Guo et al.

(10) Patent No.: US 12,718,745 B2
(45) Date of Patent: Aug. 25, 2026

(54) PIXEL CIRCUIT AND METHOD FOR DRIVING THE SAME, AND DISPLAY PANEL

(71) Applicant: Yungu (Gu'an) Technology Co., Ltd., Langfang (CN)

(72) Inventors: Enqing Guo, Langfang (CN); Cuili Gai, Langfang (CN); Junfeng Li, Langfang (CN); Rubo Xing, Hefei (CN); Shuang Guo, Hefei (CN)

(73) Assignee: Yungu (Gu'an) Technology Co., Ltd., Langang (CN)

( * ) Notice: Subject to any disclaimer, the term of this patent is extended or adjusted under 35 U.S.C. 154(b) by 0 days.

(21) Appl. No.: 19/059,290

(22) Filed: Feb. 21, 2025

(65) Prior Publication Data

US 2025/0191530 A1 Jun. 12, 2025

Related U.S. Application Data

(63) Continuation of application No. PCT/CN2023/073676, filed on Jan. 29, 2023.

(30) Foreign Application Priority Data

Aug. 30, 2022 (CN) ........................ 202211059032.X

(51) Int. Cl.

| | |
|---|---|
| ***G09G 3/32*** | (2016.01) |
| ***G09G 3/20*** | (2006.01) |
| ***G09G 3/3233*** | (2016.01) |

(52) U.S. Cl.

CPC ............. *G09G 3/32* (2013.01); *G09G 3/3233* (2013.01); *G09G 3/20* (2013.01);

(Continued)

(58) Field of Classification Search

CPC .......... G09G 3/20; G09G 3/32; G09G 3/3233; G09G 2300/043; G09G 2300/0819; G09G 2300/0852; G09G 2310/08; G09G 2320/02

See application file for complete search history.

(56) References Cited

U.S. PATENT DOCUMENTS

| | | | |
|---|---|---|---|
| 2015/0171156 | A1 | 6/2015 | Miyake |
| 2022/0208094 | A1 | 6/2022 | Jang et al. |

FOREIGN PATENT DOCUMENTS

| | | | |
|---|---|---|---|
| CN | 105741779 | A | 7/2016 |
| CN | 106504707 | A | 3/2017 |

(Continued)

OTHER PUBLICATIONS

International Search Report of Application No. PCT/CN2023/073676.

(Continued)

*Primary Examiner* — Cory A Almeida

(74) *Attorney, Agent, or Firm* — Kilpatrick Townsend & Stockton LLP

(57) ABSTRACT

The present application discloses a pixel circuit and method for driving the same, and a display panel. The pixel circuit includes a drive module, where the drive module includes a drive transistor. The drive transistor is a dual-gate transistor and includes a first gate and a second gate. The drive transistor is configured to regulate a threshold voltage of the drive transistor in response to a voltage at the second gate, and generate a driving current in response to a voltage at the first gate. The pixel circuit further includes a threshold voltage regulation module electrically connected to the drive module. The threshold voltage regulation module is configured to separately write a preset voltage into the first gate (Continued)

and the second gate, and regulate the threshold voltage of the drive transistor to a preset threshold voltage.

17 Claims, 17 Drawing Sheets

(52) U.S. Cl.
CPC ................. *G09G 2300/043* (2013.01); *G09G 2300/0819* (2013.01); *G09G 2300/0852* (2013.01); *G09G 2310/08* (2013.01); *G09G 2320/02* (2013.01)

(56) References Cited

FOREIGN PATENT DOCUMENTS

| | | | | | |
|---|---|---|---|---|---|
| CN | 105741779 | B | * | 3/2018 | ........... G09G 3/3233 |
| CN | 110036435 | A | | 7/2019 | |
| CN | 110706654 | A | | 1/2020 | |
| CN | 114360448 | A | | 4/2022 | |
| CN | 114677967 | A | | 6/2022 | |
| CN | 115294941 | A | | 11/2022 | |
| CN | 115294942 | A | | 11/2022 | |
| CN | 115376443 | A | | 11/2022 | |
| KR | 20140080729 | A | | 7/2014 | |

OTHER PUBLICATIONS

Office Action of Chinese Patent Application No. 202211059032.X Dated Mar. 31, 2023.

* cited by examiner

PIXEL CIRCUIT AND METHOD FOR DRIVING THE SAME, AND DISPLAY PANEL

CROSS-REFERENCE TO RELATED APPLICATIONS

This application is a continuation of International Application No. PCT/CN2023/073676, filed on Jan. 29, 2023, which claims priority to Chinese Patent Application No. 202211059032.X, filed on Aug. 30, 2022, which is hereby incorporated by reference in its entirety.

FIELD

The present application relates to the field of display technologies, for example, to a pixel circuit and method for driving the same, and a display panel.

BACKGROUND OF THE DISCLOSURE

With the continuous development of display technologies, people have increasingly high requirements for display panels, especially display picture quality of the display panels, which has always been one of goals that people are constantly pursuing. In a display panel, a pixel circuit is used to drive a light-emitting device for display. Therefore, stability of a signal output by the pixel circuit becomes an important factor that affects the display picture quality. However, a drive transistor in the pixel circuit has a problem of threshold voltage drift, leading to a poor threshold compensation effect, and affecting improvement of picture quality of the display panel.

SUMMARY OF THE DISCLOSURE

The present application provides a pixel circuit and a method for driving the same, and a display panel, to suppress a drift of a threshold voltage of a drive transistor in the pixel circuit, and improve a threshold compensation effect, to improve the display picture quality of the display panel.

The present application provides a pixel circuit, including:

- a drive module, including a drive transistor, where the drive transistor is a dual-gate transistor, and includes a first gate and a second gate, and the drive transistor is configured to regulate a threshold voltage of the drive transistor in response to a voltage at the second gate and generate a driving current in response to a voltage at the first gate;
- a threshold voltage regulation module electrically connected to the drive module, where the threshold voltage regulation module is configured to separately write a preset voltage into the first gate and the second gate, and regulate the threshold voltage of the drive transistor to a preset threshold voltage;
- a data writing module electrically connected to the drive module, where the data writing module is configured to write a data voltage into the drive transistor;
- a first storage module electrically connected to the drive module, where the first storage module is configured to store the voltage at the first gate; and
- a second storage module electrically connected to the drive module, where the second storage module is configured to store the voltage at the second gate.

The present application further provides a method for driving a pixel circuit, using the pixel circuit according to any embodiment of the present application. The method includes:

- at a threshold regulation stage, the threshold voltage regulation module separately writes a preset voltage into the first gate and the second gate, and controls the drive transistor in a self-conducting state to regulate a threshold voltage of the drive transistor to a preset threshold voltage;
- at a data writing stage, the data writing module writes a data voltage into the drive transistor; and
- at a light-emitting stage, the drive module generates a driving current in response to a voltage at the first gate.

The present application further provides a display panel, including the pixel circuit according to any embodiment of the present application.

In embodiments of the present application, the drive module is configured to include the drive transistor, where the drive transistor is a dual-gate transistor. In addition, corresponding to a configuration mode of the drive transistor, the threshold voltage regulation module is configured to be electrically connected to the drive module. The threshold voltage regulation module is configured to separately write the preset voltage into the first gate and the second gate, and regulate the threshold voltage of the drive transistor to the preset threshold voltage. The second storage module is electrically connected to the drive module, and is configured to store the voltage at the second gate. Therefore, in the embodiments of the present application, the threshold voltage of the drive transistor is actively regulated, to suppress a drift of the threshold voltage of the drive transistor. Compared with a manner of passively compensating for the threshold voltage, in the embodiments of the present application, the threshold compensation effect of the pixel circuit is improved, to improve the display picture quality of the display panel.

DETAILED DESCRIPTION OF THE DISCLOSURE

The embodiments of the present application are described below clearly and comprehensively with reference to the accompanying drawings in the embodiments of the present application.

It should be noted that the terms such as “first” and “second” in the specification and the claims of the present application and in the aforementioned accompanying drawings are used to distinguish similar objects, and do not necessarily describe a specific order or sequence. It should be understood that the data used in this way can be interchanged where appropriate, and the embodiments of the present application described herein can be implemented in a sequence other than those illustrated or described herein. In addition, the terms “include” and “have” and any variation thereof are intended to cover a non-exclusive inclusion, for example, a process, method, system, product, or apparatus that includes a series of steps or units is not necessarily limited to those steps or units that are explicitly listed, but may include other steps or units not explicitly listed or inherent to such a process, method, product, or apparatus.

Figure 1:
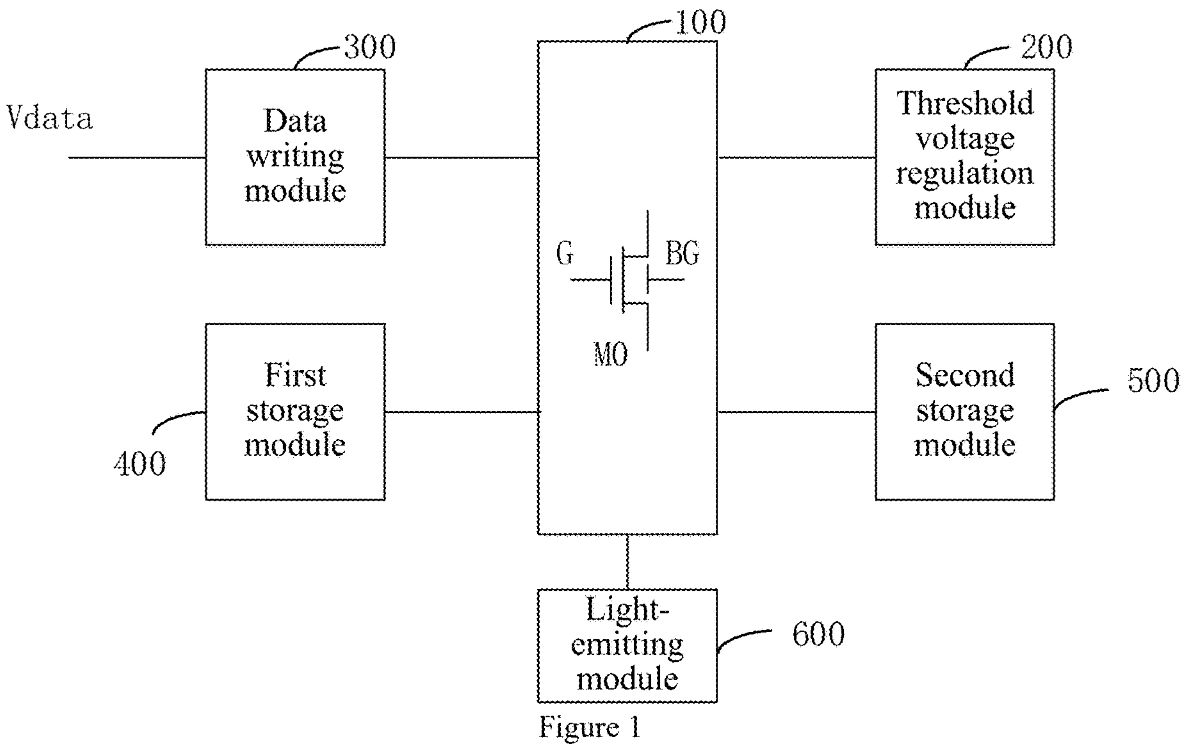
FIG. 1 is a schematic diagram of a pixel circuit according to an embodiment of the present application.

An embodiment of the present application provides a pixel circuit. FIG. 1 is a schematic diagram of a pixel circuit according to an embodiment of the present application. Referring to FIG. 1, the pixel circuit includes: a drive module 100, a threshold voltage regulation module 200, a data writing module 300, a first storage module 400, and a second storage module 500.

The drive module 100 includes a drive transistor M0. The drive transistor M0 is a dual-gate transistor and includes a first gate G, a second gate BG, a first electrode (source S), and a second electrode (drain D). The drive transistor M0 is configured to regulate a threshold voltage Vth of the drive transistor in response to a voltage at the second gate BG, and generate a driving current in response to a voltage at the first gate G.

The threshold voltage regulation module 200 is electrically connected to the drive module 100. The threshold voltage regulation module 200 is configured to separately write a preset voltage into the first gate G and the second gate BG, and regulate the threshold voltage Vth of the drive transistor M0 to a preset threshold voltage Vth0. For example, the threshold voltage regulation module 200 is connected to both the first gate G and the second gate BG of the drive transistor M0.

The data writing module 300 is electrically connected to the drive module 100. The data writing module 300 is configured to write a data voltage Vdata into the drive transistor M0.

The first storage module 400 is electrically connected to the drive module 100. The first storage module 400 is configured to store the voltage at the first gate G.

The second storage module 500 is electrically connected to the drive module 100. The second storage module 500 is configured to store the voltage at the second gate BG.

Figure 2:
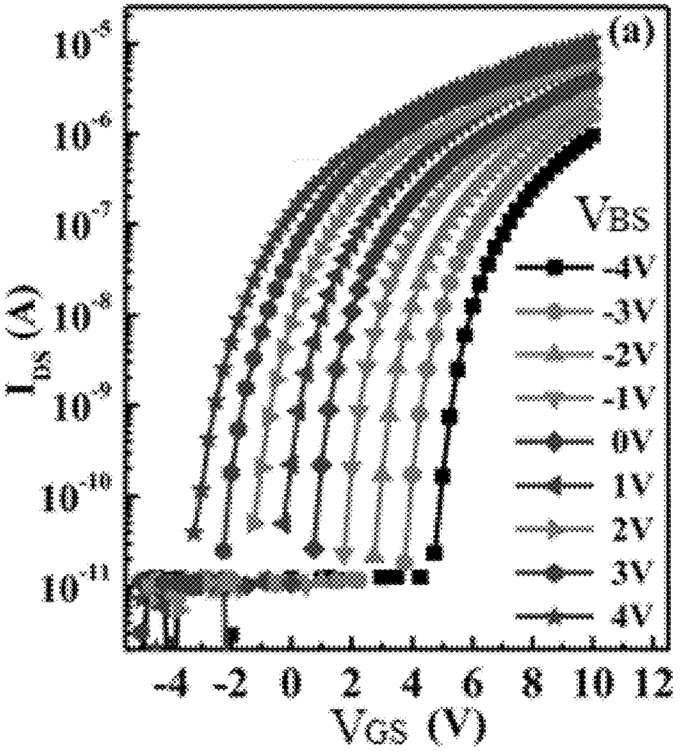
FIG. 2 is a schematic diagram of IDVG characteristic curves of a dual-gate transistor according to an embodiment of the present application.

In this embodiment of the present application, the drive transistor M0 is arranged as a vertical dual-gate transistor, and the threshold voltage Vth of the drive transistor M0 can be regulated. FIG. 2 is a schematic diagram of IDVG characteristic curves of a dual-gate transistor according to an embodiment of the present application. Referring to FIG. 2, the abscissa represents a voltage difference $V_{GS}$ between the first gate G and the source S of the drive transistor M0, and the ordinate represents the driving current $I_{DS}$ generated by the drive transistor M0. The characteristic curves in FIG. 2 shift with a voltage difference $V_{BS}$ between the second gate BG and the source S of the drive transistor M0. Using an N-type transistor as an example, FIG. 2 shows the change of the voltage difference $V_{BS}$ from −4 V to +4 V. As the voltage difference $V_{BS}$ increases, the characteristic curve shifts to the left, indicating that the drive transistor M0 can be turned on by using a small voltage difference $V_{GS}$, that is, the threshold voltage Vth of the drive transistor M0 is reduced. Therefore, it can be seen that the threshold voltage Vth can be regulated by regulating the voltage difference $V_{BS}$, and a greater voltage difference $V_{BS}$ leads to a more negative (smaller) threshold voltage Vth.

For example, a driving process of the pixel circuit includes a threshold regulation stage, a data writing stage, and a light-emitting stage. At the threshold regulation stage, the threshold voltage regulation module 200 separately writes a preset voltage into the first gate G and the second gate BG, and controls the drive transistor M0 in a self-conducting state to regulate the threshold voltage Vth of the drive transistor to a preset threshold voltage Vth0. At the data writing stage, the data writing module 300 writes a data voltage Vdata into the drive transistor M0. At the light-emitting stage, the drive module 100 generates a driving current in response to a voltage at the first gate G.

With reference to FIG. 2, for example, after the preset voltage is written into the first gate G and the second gate BG, the voltage difference $V_{BS}$ between the second gate BG and the source S is 4 V, corresponding to the first characteristic curve from left to right. In this case, if the voltage difference $V_{GS}$ between the first gate G and the source S is 0 V, it can be seen from the characteristic curve that the drive transistor M0 is in an on state. The second gate BG is discharged with the drive transistor M0 being self-conducting, and the characteristic curve corresponding to the drive transistor M0 shifts to the right, to redulate the threshold voltage Vth of the drive transistor M0, until the voltage difference $V_{BS}$ is 0 V, corresponding to the fifth characteristic curve from left to right. The drive transistor M0 is no longer turned on when the voltage difference $V_{GS}$ is 0 V. In this case, the second storage module 500 stores a voltage at the second gate BG, to store the threshold voltage Vth.

Therefore, it can be seen that in this embodiment of the present application, the drive module 100 is configured to include the drive transistor M0, and the drive transistor M0 is a vertical dual-gate transistor. In addition, corresponding to a configuration mode of the drive transistor M0, the threshold voltage regulation module 200 is configured to be electrically connected to the drive module 100. The threshold voltage regulation module 200 is configured to separately write the preset voltage into the first gate G and the second gate BG, to regulate the threshold voltage Vth of the drive transistor M0 to the preset threshold voltage Vth0. The second storage module 500 is electrically connected to the drive module 100 and is configured to store the voltage at the second gate BG. Therefore, in this embodiment of the present application, the threshold voltage Vth of the drive transistor M0 is actively regulated, to suppress a drift of the threshold voltage Vth of the drive transistor M0. Compared with a manner of passively compensating for the threshold voltage Vth, in this embodiment of the present application, a threshold compensation effect of the pixel circuit is improved, to improve the display picture quality of the display panel.

On the basis of the above embodiments, the first gate G and the second gate BG are a top gate and a bottom gate of each other. For example, if the first gate G is a top gate, the second gate BG is a bottom gate. If the first gate G is a bottom gate, the second gate BG is a top gate.

In the above embodiments, there are multiple configuration modes and combination modes for various modules, and some of the configuration modes and combination modes are described below, but are not used as a limitation on the present application.

Figure 3:
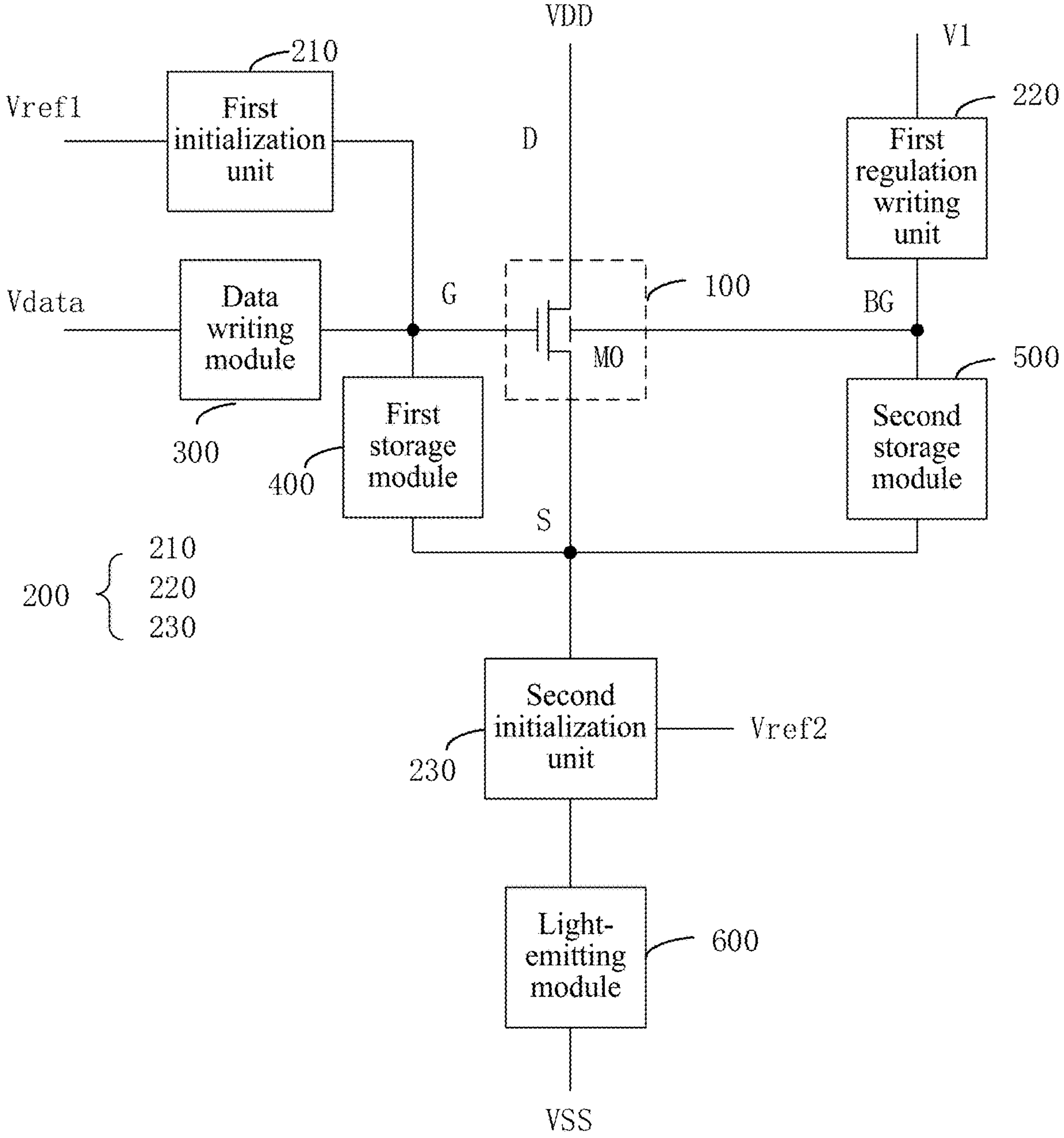
FIG. 3 is a schematic diagram of another pixel circuit according to an embodiment of the present application.

FIG. 3 is a schematic diagram of another pixel circuit according to an embodiment of the present application. Referring to FIG. 3, in an embodiment of the present application, the threshold voltage regulation module 200 includes: a first initialization unit 210, a first regulation writing unit 220, and a second initialization unit 230.

The first initialization unit 210 is electrically connected to the first gate G of the drive transistor M0. The first initialization unit 210 is configured to write a first reference voltage Vref1 into the first gate G.

The first regulation writing unit 220 is electrically connected to the second gate BG of the drive transistor M0. The first regulation writing unit 220 is configured to write a first fixed voltage V1 into the second gate BG.

The second initialization unit 230 is electrically connected to the first electrode of the drive transistor M0. The second initialization unit 230 is configured to write a second reference voltage Vref2 into the first electrode of the drive transistor M0. A voltage difference between the first reference voltage Vref1 and the second reference voltage Vref2 is the preset threshold voltage Vth0.

The drive transistor M0 has a symmetrical structure, and definitions of a source S and a drain D of the drive transistor are determined by a type and a circuit connection relationship of the drive transistor M0. FIG. 3 exemplarily shows that the drive transistor M0 is an N-type transistor. In other embodiments, the drive transistor M0 may alternatively be provided as a P-type transistor. Furthermore, FIG. 3 exemplarily shows that the first electrode of the drive transistor M0 is the source S and the second electrode is the drain D. In other embodiments, the first electrode of the drive transistor M0 may alternatively be provided as the drain D and the second electrode may be provided as the source S.

A working principle of the threshold voltage regulation module 200 is as follows: The first initialization unit 210 writes a first reference voltage Vref0 into the first gate G, and the second initialization unit 230 writes a second reference voltage Vref2 into the first electrode of the drive transistor M0, and a voltage difference $V_{GS}$ between the first gate G and the source S of the drive transistor M0 is Vref1−Vref2. The first regulation writing unit 220 writes a first fixed voltage V1 into the second gate BG, and a voltage difference $V_{BS}$ between the second gate BG and the source S of the drive transistor M0 is V1−Vref2. For example, Vref1−Vref2=0 V, V1−Vref2=4 V. With reference to FIG. 2, the voltage difference $V_{BS}$=4 V, corresponding to the first characteristic curve from left to right. In addition, the voltage difference $V_{GS}$=0 V, and the drive transistor M0 is in an on state. The second gate BG is discharged through the drive transistor M0 that is self-conducting, the voltage difference $V_{BS}$ is reduced, and the characteristic curve corresponding to the drive transistor M0 shifts to the right, corresponding to the second characteristic curve from left to right. In addition, the voltage difference $V_{GS}$=0 V, and the drive transistor M0 is still in the on state, until the voltage difference $V_{BS}$=0 V, corresponding to the fifth characteristic curve from left to right. The voltage difference $V_{GS}$=0 V, and the drive transistor M0 is no longer turned on and the second gate BG no longer discharges.

Therefore, when the drive transistor M0 is turned off, voltage difference $V_{GS}$=threshold voltage Vth=voltage difference $V_{BS}$=Vref1−Vref2. The threshold voltage regulation module 200 can implement a function of regulating the threshold voltage Vth of the drive transistor M0, and a voltage difference between the first reference voltage Vref1 and the second reference voltage Vref2 is the preset threshold voltage Vth0.

Still referring to FIG. 3, in an embodiment of the present application, the first storage module 400 is connected between the first gate G and the first electrode (source S) of the drive transistor M0, and is configured to store the voltage difference $V_{GS}$, to store the voltage at the first gate G.

In an embodiment of the present application, the second storage module 500 is connected between the second gate BG and the first electrode (source S) of the drive transistor M0, and is configured to store the voltage difference $V_{BS}$, to store the voltage at the second gate BG.

In an embodiment of the present application, the data writing module 300 is electrically connected to the first gate G of the drive transistor M0. The data writing module 300 is configured to write a data voltage Vdata into the first gate G (that is, the first storage module 400).

In an embodiment of the present application, the second initialization unit 230 is arranged between the drive module 100 and a light-emitting module 600, for example, arranged between the first electrode (source S) and the light-emitting module 600.

Still referring to FIG. 3, for example, the driving method for a pixel circuit includes: a threshold regulation stage, a data writing stage, and a light-emitting stage, where the threshold regulation stage includes a first sub-stage and a second sub-stage.

At the first sub-stage of the threshold regulation stage, the first initialization unit 210 writes a first reference voltage Vref1 into the first gate G. The second initialization unit 230 writes a second reference voltage Vref2 into the first electrode (source S) of the drive transistor M0. The first regulation writing unit 220 writes a first fixed voltage V1 into the second gate BG.

At the second sub-stage of the threshold regulation stage, the drive transistor M0 is self-conducting to regulate a threshold voltage Vth of the drive transistor M0 to a preset threshold voltage Vth0. The preset threshold voltage Vth0 is a difference between the first reference voltage Vref1 and the second reference voltage Vref2, that is, Vth0=Vref1−Vref2.

At the data writing stage, the data writing module 300 writes a data voltage Vdata into the first gate G. The second initialization unit 230 writes the second reference voltage Vref2 into the first electrode (source S) of the drive transistor M0 to ensure that at the light emitting stage, voltage difference $V_{GS}$=Vdata−Vref2.

At the light emitting stage, the drive module 100 generates a driving current in response to a voltage at the first gate G. Here, driving current $I=K*(V_{GS}-Vth0)^2=K*(Vdata-Vref2-Vth0)^2$. K is related to the size and mobility of the drive transistor M0, and is determined by a manufacturing process. Vdata, Vref2, and Vth0 are all set values. For example, if Vref1=Vref2, and Vth0=0 V, driving current $I=K*(Vdata-Vref2)^2=K*(Vdata-Vref1)^2$, where Vth0=Vref1−Vref2. Therefore, a formula for the driving current may alternatively be directly rewritten as $I=K*(Vdata-Vref2-(Vref1-Vref2))^2=K*(Vdata-Vref1)^2$. In this formula, Vdata and Vref1 are both set values. In summary, no matter which formula is used, the driving current obtained is determined by the set values and is not affected by the threshold voltage.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

Figure 4:
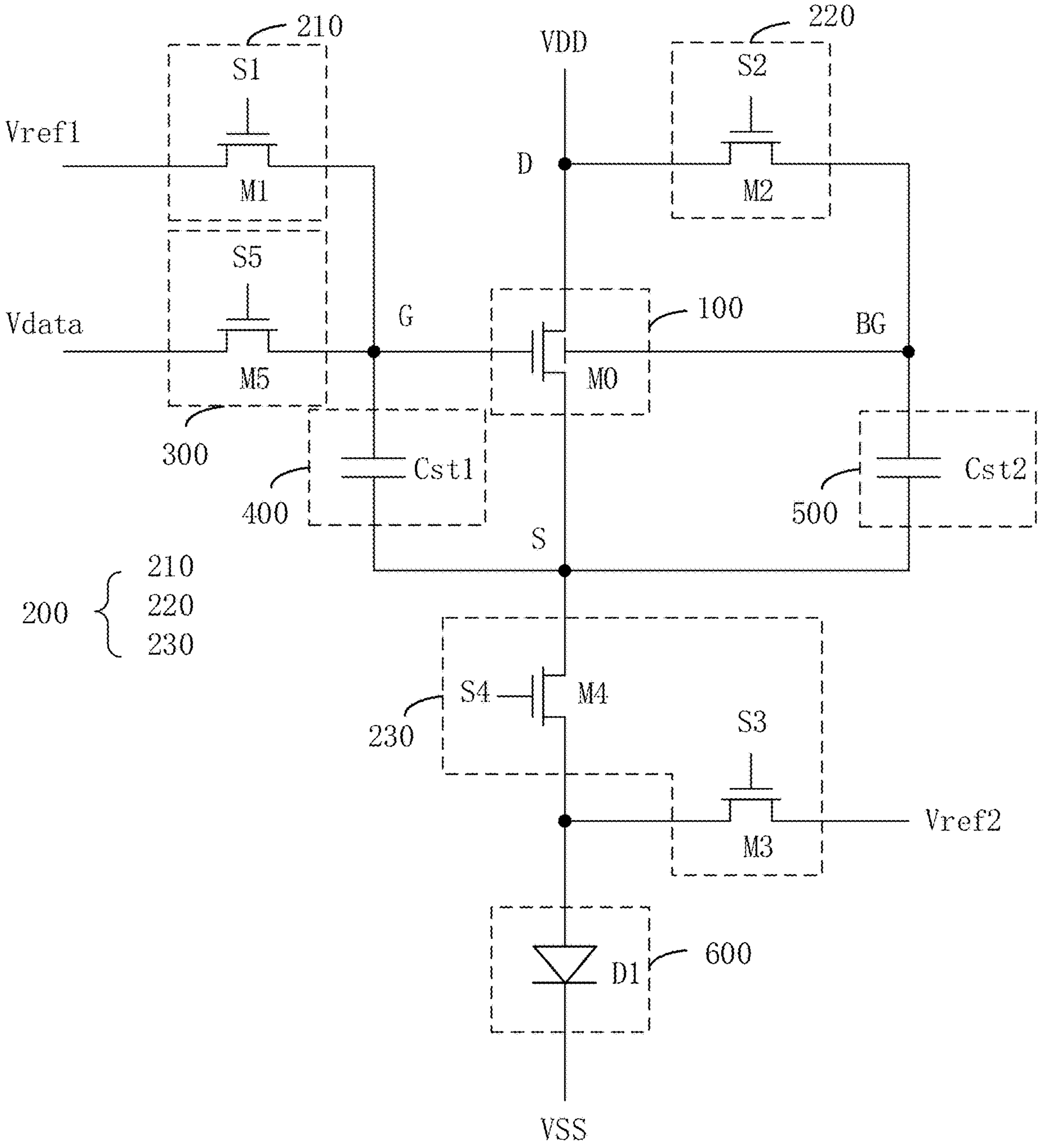
FIG. 4 is a schematic diagram of still another pixel circuit according to an embodiment of the present application.

Configuration modes of the modules in the pixel circuit shown in FIG. 3 are described below. FIG. 4 is a schematic diagram of still another pixel circuit according to an embodiment of the present application. Referring to FIG. 4, in an embodiment of the present application, the first initialization unit 210 includes a first transistor M1. A gate of the first transistor M1 is connected to a first scan signal S1. A first electrode of the first transistor M1 is electrically connected to the first gate G. A second electrode of the first transistor M1 is connected to a first reference voltage Vref1. Such arrangement ensures that a circuit structure of the first initialization unit 210 is simple and easy to implement.

In an embodiment of the present application, the first regulation writing unit 220 includes a second transistor M2, where a gate of the second transistor M2 is connected to a second scan signal S2, a first electrode of the second transistor M2 is electrically connected to the second gate BG, and a second electrode of the second transistor M2 is connected to the first fixed voltage V1. In one embodiment, the second electrode (drain D) of the drive transistor M0 is connected to a first power voltage VDD, and the first power voltage VDD is reused as the first fixed voltage V1, that is, the second electrode of the second transistor M2 is connected to the first power voltage VDD. Such arrangement ensures that a circuit structure of the first regulation writing unit 220 is simple and easy to implement.

In an embodiment of the present application, the second initialization unit 230 includes: a third transistor M3 and a fourth transistor M4. A gate of the third transistor M3 is connected to a third scan signal S3. A first electrode of the third transistor M3 is connected to the second reference voltage Vref2. A second electrode of the third transistor M3 is electrically connected to a first electrode of the fourth transistor M4. A gate of the fourth transistor M4 is connected to a fourth scan signal S4. A second electrode of the fourth transistor M4 is electrically connected to the first electrode (source S) of the drive transistor M0. Such arrangement ensures that a circuit structure of the second initialization unit 230 is simple and easy to implement.

In an embodiment of the present application, the data writing module 300 includes a fifth transistor M5, where a gate of the fifth transistor M5 is connected to a fifth scan signal S5, a first electrode of the fifth transistor M5 is connected to the data voltage Vdata, and a second electrode of the fifth transistor M5 is electrically connected to the first gate G of the drive transistor M0. Such arrangement ensures that a circuit structure of the data writing module 300 is simple and easy to implement.

In an embodiment of the present application, the first storage module 400 includes a first capacitor Cst1, where a first electrode of the first capacitor Cst1 is electrically connected to the first gate G, and a second electrode of the first capacitor Cst1 is electrically connected to the first electrode (source S) of the drive transistor M0. Such arrangement ensures that a circuit structure of the first storage module 400 is simple and easy to implement.

In an embodiment of the present application, the second storage module 500 includes a second capacitor Cst2, where a first electrode of the second capacitor Cst2 is electrically connected to the second gate BG, and a second electrode of the second capacitor Cst2 is electrically connected to the first electrode (source S) of the drive transistor M0. Such arrangement ensures that a circuit structure of the second storage module 500 is simple and easy to implement.

Figure 5:
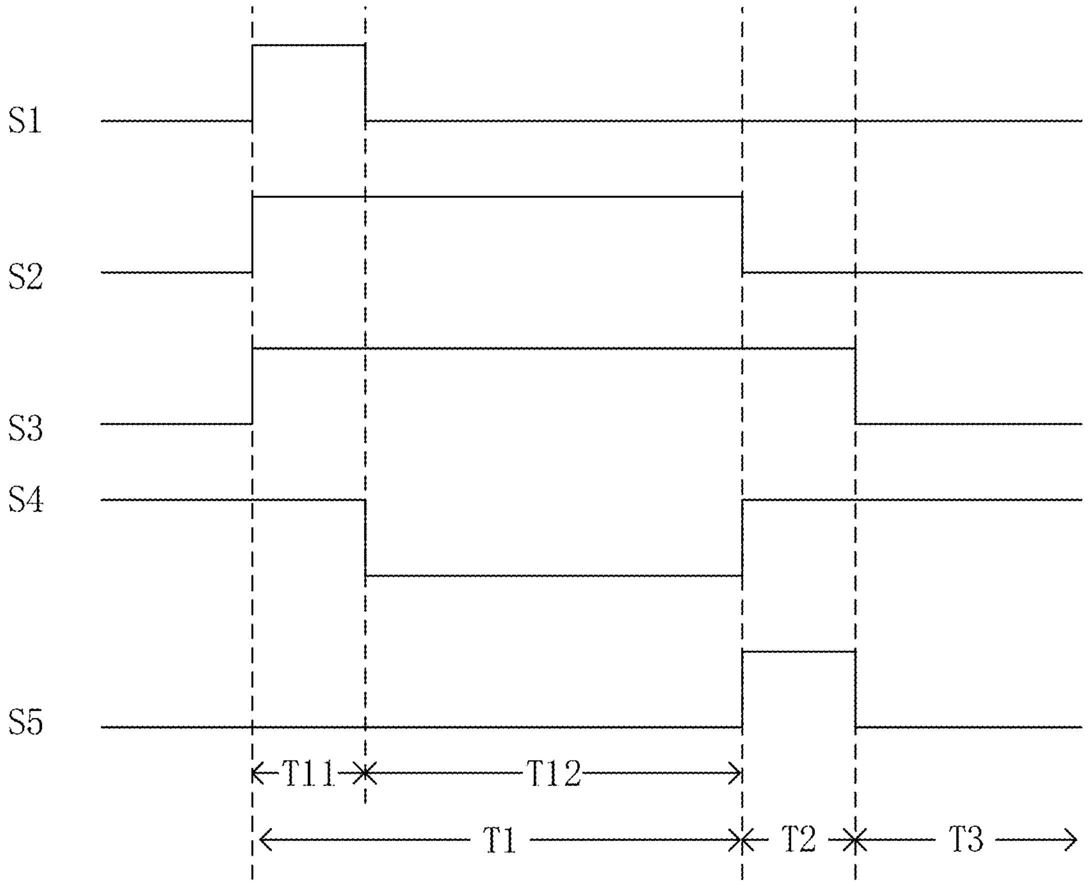
FIG. 5 is a schematic diagram of driving timing of a pixel circuit according to an embodiment of the present application.

The method for driving a pixel circuit shown in FIG. 4 is described below with reference to driving timing. FIG. 5 is a schematic diagram of driving timing of a pixel circuit according to an embodiment of the present application. With reference to FIG. 4 and FIG. 5, for example, all transistors are N-type transistors that are manufactured using a metal oxide semiconductor process, for example, may be manufactured using indium gallium zinc oxide (IGZO). The N-type transistor is turned on when a gate of the N-type transistor is at a high level, and is turned off when the gate is at a low level. The method for driving a pixel circuit includes: a threshold regulation stage T1, a data writing stage T2, and a light-emitting stage T3, where the threshold regulation stage T1 includes a first sub-stage T11 and a second sub-stage T12.

At the first sub-stage T11 of the threshold regulation stage T1, the first scan signal S1, the second scan signal S2, the third scan signal S3, and the fourth scan signal S4 are all at a high level, and the fifth scan signal S5 is at a low level. The fifth transistor M5 is turned off under the control of the fifth scan signal S5, and the other transistors are all turned on, that is, the first transistor M1 to the fourth transistor M4 are all turned on. The first transistor M1 writes a first reference voltage Vref1 into the first gate G. The third transistor M3 and the fourth transistor M4 write a second reference voltage Vref2 into the first electrode (source S) of the drive transistor M0. The second transistor M2 writes a first power voltage VDD into the second gate BG. A voltage difference between the first gate G and the first electrode (source S) of the drive transistor M0 is $V_{GS}$=Vref1−Vref2, and a voltage difference between the second gate BG and the source S is $V_{BS}$=VDD−Vref2.

At the second sub-stage T12 of the threshold regulation stage T1, the first scan signal S1 and the fourth scan signal S4 are switched from the high level to the low level, and the other scan signals remain in a state of the first sub-stage T11. The fifth transistor M5 remains in an off state. The first transistor M1 is switched from an on state to the off state under the control of the first scan signal S1. The fourth transistor M4 is switched from the on state to the off state under the control of the fourth scan signal S4. The voltage difference $V_{GS}$ between the first gate G and the first electrode (source S) of the drive transistor M0 is maintained by the first capacitor Cst1. The drive transistor M0 is self-conducting and a voltage at the first electrode (source S) of the drive transistor is gradually increased until the drive transistor M0 is turned off, and voltage difference $V_{GS}$=threshold voltage Vth=voltage difference $V_{BS}$=Vref1−Vref2. This implements that the threshold voltage Vth of the drive transistor M0 is regulated to a difference between the first reference voltage Vref1 and the second reference voltage Vref2.

At the data writing stage T2, the first scan signal S1 and the second scan signal S2 are at the low level, and the third scan signal S3, the fourth scan signal S4, and the fifth scan signal S5 are all at the high level. The fifth transistor M5 is turned on under the control of the fifth scan signal S5, to write a data voltage Vdata into the first gate G. The third transistor M3 and the fourth transistor M4 are turned on, to write the second reference voltage Vref2 into the first electrode (source S) of the drive transistor M0. This ensures that at the light-emitting stage T3, voltage difference $V_{GS}$=Vdata−Vref2.

At the light-emitting stage T3, the first scan signal S1, the second scan signal S2, the third scan signal S3, and the fifth scan signal S5 are all at the low level, and the fourth scan signal S4 is at the high level. The drive transistor M0 generates a driving current in response to a voltage at the first gate G. Here, driving current $I=K*(V_{GS}-Vth0)^2=K*(Vdata-Vref2-Vth0)^2=K*(Vdata-Vref2-(Vref1-Vref2))^2=K*(Vdata-Vref1)^2$. K is related to the size and mobility of the drive transistor M0, and is determined by a manufacturing process. Vdata and Vref1 are both set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

In another embodiment of the present application, at the second sub-stage T12 of the threshold regulation stage T1, the third scan signal S3 and the fourth scan signal S4 may alternatively be configured to have a same variation, and are switched from the high level to the low level. The third transistor M3 is switched from the on state to the off state under the control of the third scan signal S3, and the second reference voltage Vref2 is no longer written into an anode of a light-emitting device D1. The voltage difference $V_{GS}$ between the first gate G and the first electrode (source S) of the drive transistor M0 is maintained by the first capacitor Cst1. The drive transistor M0 is self-conducting and a voltage at the first electrode (source S) of the drive transistor is gradually increased until the drive transistor M0 is turned off, and voltage difference $V_{GS}$=threshold voltage Vth=voltage difference $V_{BS}$=Vref1−Vref2. This implements that the threshold voltage Vth of the drive transistor M0 is regulated to a difference between the first reference voltage Vref1 and the second reference voltage Vref2. Therefore, it can be seen that, at the second sub-stage T12 of the threshold regulation stage T1, whether the third transistor M3 is turned on has no impact on a working process of the pixel circuit.

In the above embodiments, it can be seen from a calculation formula for the driving current that, the magnitude of the driving current is related to the first reference voltage Vref1 but not related to the second reference voltage Vref2. However, it can be seen from the preceding analysis that the threshold voltage of the drive transistor M0 is determined by the difference between the first reference voltage Vref1 and the second reference voltage Vref2. In order to ensure normal operation of the pixel circuit, it is still necessary to define a relationship between the magnitudes of the first reference voltage Vref1 and the second reference voltage Vref2. In one embodiment, the transistors are all N-type transistors. The first reference voltage Vref1 is greater than or equal to the second reference voltage Vref2, and the preset threshold voltage Vth0 of the drive transistor M0 is greater than or equal to 0 V. For example, if the drive transistor M0 is the N-type transistor, the threshold voltage Vth of the drive transistor M0 is normally greater than 0, and the preset threshold voltage Vth0 is the difference between the first reference voltage Vref1 and the second reference voltage Vref2. Accordingly, configuring the first reference voltage Vref1 to be greater than or equal to the second reference voltage Vref2 facilitates the normal operation of the drive transistor M0. In one embodiment, the first reference voltage Vref1 is equal to the second reference voltage Vref2, and the preset threshold voltage Vth0 of the drive transistor M0 is equal to 0 V. Such arrangement facilitates the reuse of the first reference voltage Vref1 as the second reference voltage Vref2, to reduce a quantity of signal lines.

On the basis of the above embodiments, the light-emitting module 600 is further connected to a second power voltage VSS. The first power voltage VDD is greater than the second reference voltage Vref2. The second reference voltage Vref2 is greater than the second power voltage VSS. In addition, a difference between the second reference voltage Vref2 and the second power voltage VSS is less than a turn-on voltage of the light-emitting module 600. For example, the light-emitting module 600 includes a light-emitting device D1, where an anode of the light-emitting device D1 is electrically connected to the first electrode of the fourth transistor M4, and a cathode of the light-emitting device D1 is connected to the second power voltage VSS.

For example, in addition to voltage difference $V_{GS}$>threshold voltage Vth, a condition for turning on the drive transistor M0 further includes drain voltage $V_D$>source voltage $V_S$. The drain voltage $V_D$ is the first power voltage, and the source voltage $V_S$ is the second reference voltage Vref2. Therefore, it is further necessary to configure the first power voltage VDD to be greater than the second reference voltage Vref2.

In addition, it can be seen from a driving process of the pixel circuit that at the threshold regulation stage, the second reference voltage Vref2 is written into an anode of the light-emitting module 600 through the third transistor M3. In this case, a voltage difference between two terminals of the light-emitting module 600 is Vref2−VSS, and configuring Vref2−VSS to be less than the turn-on voltage of the light-emitting module 600 helps prevent the light-emitting module 600 from being mistakenly turned on at the threshold regulation stage.

Figure 6:
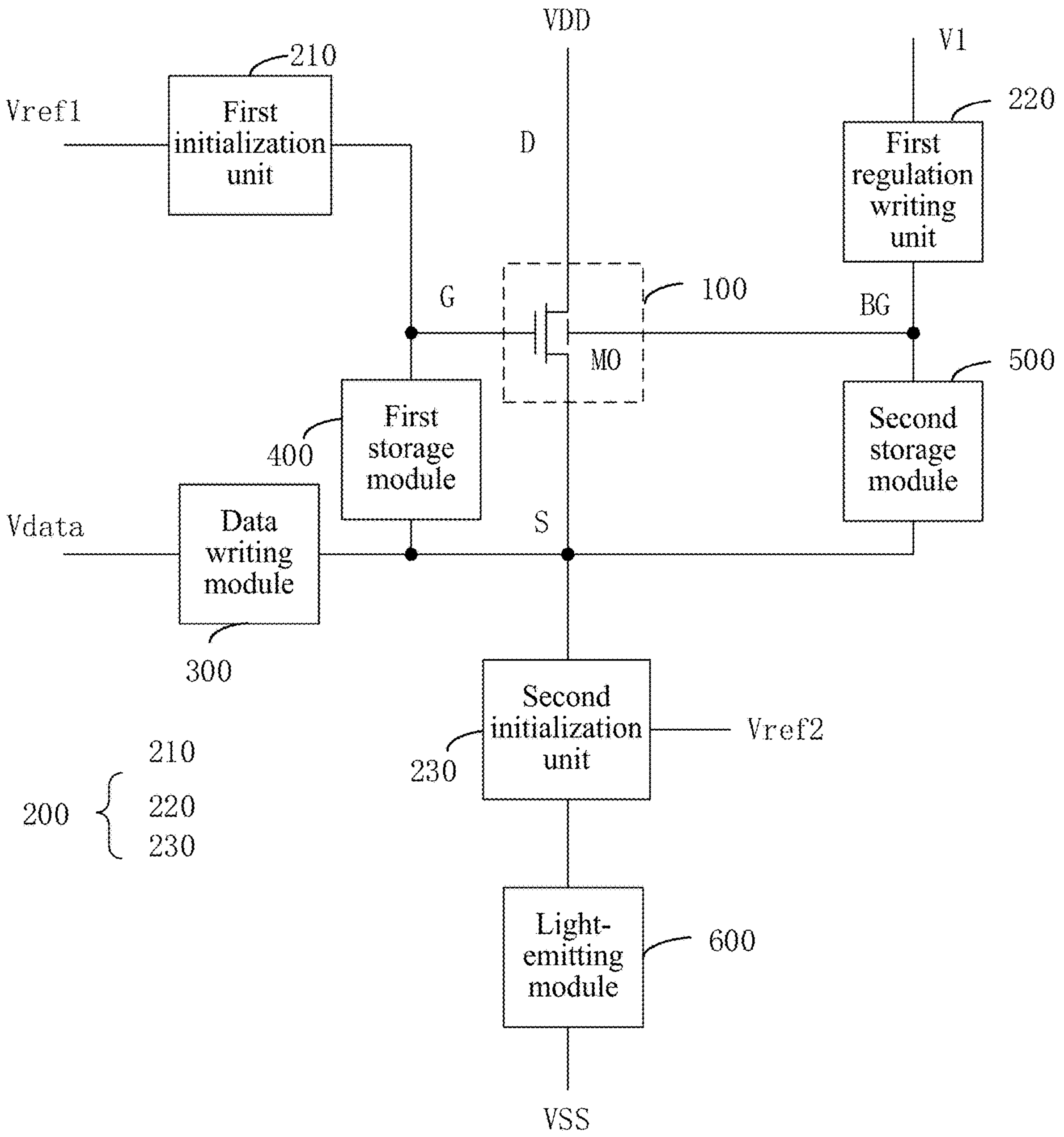
FIG. 6 is a schematic diagram of still another pixel circuit according to an embodiment of the present application.

FIG. 6 is a schematic diagram of still another pixel circuit according to an embodiment of the present application. Referring to FIG. 6, in an embodiment of the present application, unlike FIG. 3, the data writing module 300 is electrically connected to the first electrode (source S) of the drive transistor M0. The data writing module 300 is configured to write a data voltage Vdata into the first electrode (source S) of the drive transistor M0, and the data writing module 300 is configured to write the data voltage Vdata into the first storage module 400.

For example, the method for driving a pixel circuit includes: a threshold regulation stage, a data writing stage, and a light-emitting stage, where the threshold regulation stage includes a first sub-stage and a second sub-stage.

At the first sub-stage of the threshold regulation stage, the first initialization unit 210 writes a first reference voltage Vref1 into the first gate G. The second initialization unit 230 writes a second reference voltage Vref2 into the first electrode (source S) of the drive transistor M0. The first regulation writing unit 220 writes a first fixed voltage V1 into the second gate BG.

At the second sub-stage of the threshold regulation stage, the drive transistor M0 is self-conducting to regulate a threshold voltage Vth of the drive transistor M0 to a preset threshold voltage Vth0. The preset threshold voltage Vth0 is a difference between the first reference voltage Vref1 and the second reference voltage Vref2.

At the data writing stage, the data writing module 300 writes a data voltage Vdata into the first electrode (source S) of the drive transistor M0. The first initialization unit 210 writes the first reference voltage Vref1 into the first gate G to ensure that at the light-emitting stage, voltage difference $V_{GS}$=Vref1−Vdata.

At the light-emitting stage, the drive module 100 generates a driving current in response to a voltage at the first gate G. Here, driving current $I=K*(V_{GS}-Vth0)^2=K*(Vref1-Vdata-Vth0)^2=K*(Vdata-Vref2-(Vref1-Vref2))^2=K*(Vdata-Vref1)^2$. K is related to the size and mobility of the drive transistor M0, and is determined by a manufacturing process. Vdata and Vref1 are both set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

Figure 7:
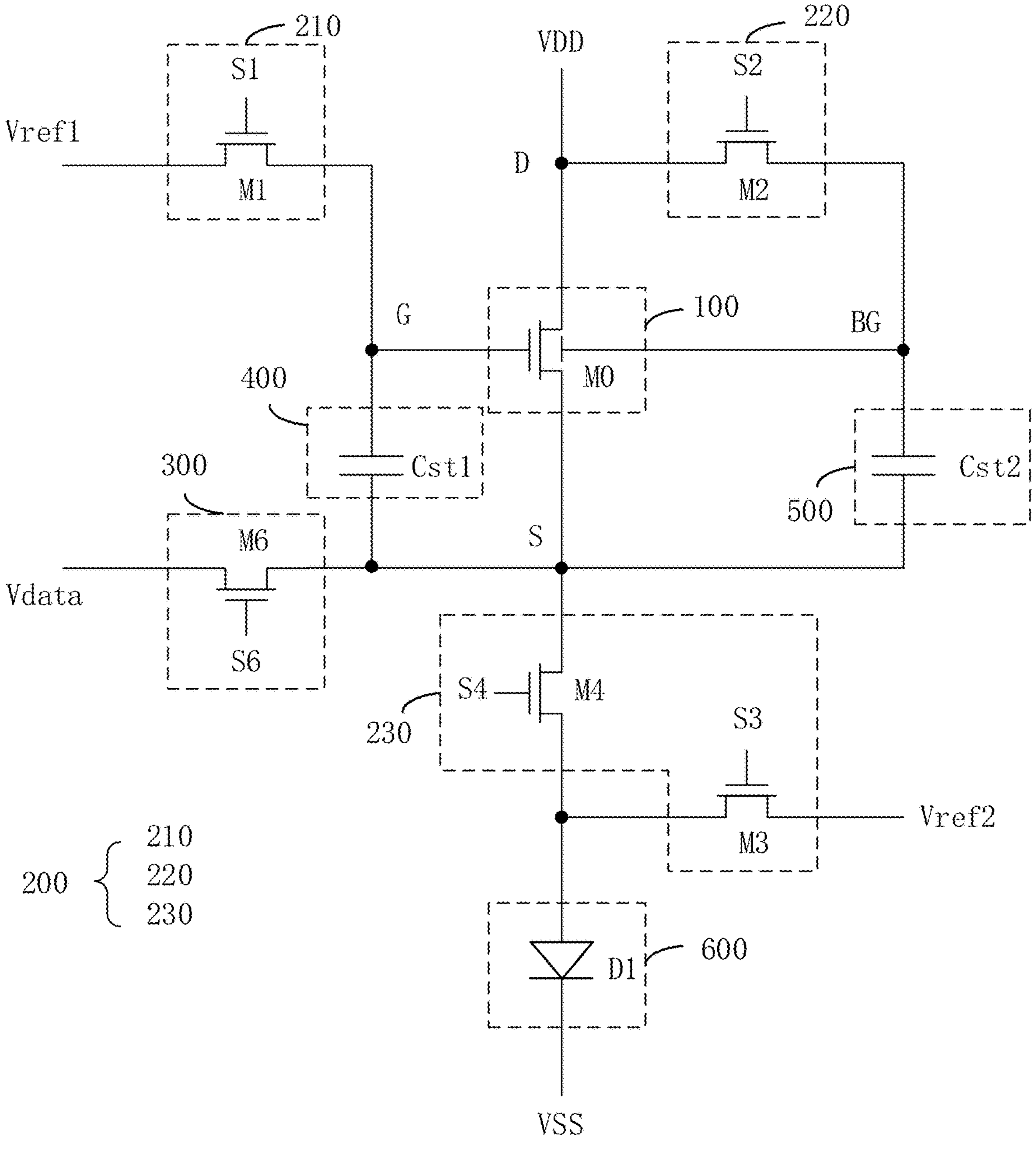
FIG. 7 is a schematic diagram of still another pixel circuit according to an embodiment of the present application.

FIG. 7 is a schematic diagram of still another pixel circuit according to an embodiment of the present application. Referring to FIG. 7, unlike FIG. 4, the data writing module 300 includes a sixth transistor M6, where a gate of the sixth transistor M6 is connected to a sixth scan signal S6, a first electrode of the sixth transistor M6 is connected to the data voltage Vdata, and a second electrode of the sixth transistor M6 is electrically connected to the first electrode of the drive transistor M0.

Figure 8:
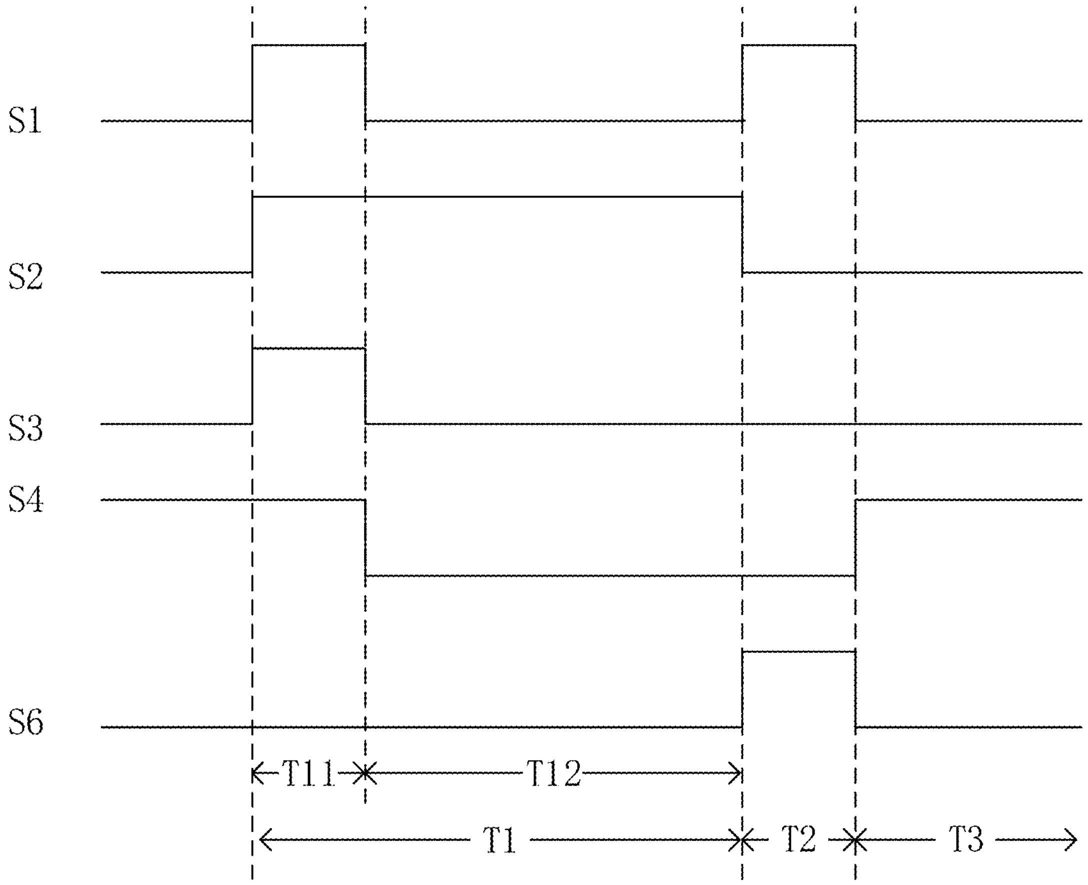
FIG. 8 is a schematic diagram of driving timing of another pixel circuit according to an embodiment of the present application.

The method for driving a pixel circuit shown in FIG. 7 is described below with reference to driving timing. FIG. 8 is a schematic diagram of driving timing of another pixel circuit according to an embodiment of the present application. With reference to FIG. 7 and FIG. 8, for example, the transistors are all N-type transistors. The driving method for driving a pixel circuit includes: a threshold regulation stage T1, a data writing stage T2, and a light-emitting stage T3, where the threshold regulation stage T1 includes a first sub-stage T11 and a second sub-stage T12.

At the first sub-stage T11 of the threshold regulation stage T1, the first scan signal S1, the second scan signal S2, the third scan signal S3, and the fourth scan signal S4 are all at a high level, and the sixth scan signal S6 is at a low level. The sixth transistor M6 is turned off under the control of the sixth scan signal S6, and the other transistors are turned on, that is, the first transistor M1 to the fourth transistor M4 are all turned on. The first transistor M1 writes a first reference voltage Vref1 into the first gate G. The third transistor M3 and the fourth transistor M4 write a second reference voltage Vref2 into the first electrode (source S) of the drive transistor M0. The second transistor M2 writes a first power voltage VDD into the second gate BG. A voltage difference between the first gate G and the first electrode (source S) of the drive transistor M0 is $V_{GS}$=Vref1−Vref2, and a voltage difference between the second gate BG and the source S is $V_{BS}$=VDD−Vref2.

At the second sub-stage T12 of the threshold regulation stage T1, the first scan signal S1, the third scan signal, and the fourth scan signal S4 are switched from the high level to the low level, and the second scan signal S2 and the sixth scan signal S6 remain in a state of the first sub-stage T11. The sixth transistor M6 remains in an off state. The first transistor M1 is switched from an on state to the off state under the control of the first scan signal S1. The third transistor M3 is switched from the on state to the off state under the control of the third scan signal S3. The fourth transistor M4 is switched from the on state to the off state under the control of the fourth scan signal S4. The voltage difference $V_{GS}$ between the first gate G and the first electrode (source S) of the drive transistor M0 is maintained by the first capacitor Cst1. The drive transistor M0 is self-conducting and a voltage at the first electrode (source S) of the drive transistor is gradually increased until the drive transistor M0 is turned off, and voltage difference $V_{GS}$=threshold voltage Vth0=voltage difference $V_{BS}$=Vref1−Vref2. This implements that the threshold voltage Vth of the drive transistor M0 is regulated to a difference between the first reference voltage Vref1 and the second reference voltage Vref2.

At the data writing stage T2, the first scan signal S1 and the sixth scan signal S6 are at the high level, and the second scan signal S2, the third scan signal S3, and the fourth scan signal S4 are all at the low level. The sixth transistor M6 is turned on under the control of the sixth scan signal S6, to write a data voltage Vdata into the first electrode (source S) of the drive transistor M0. The first transistor M1 is turned on, to write the first reference voltage Vref1 into the first gate G. This ensures that at the light-emitting stage T3, voltage difference $V_{GS}$=Vref1−Vdata.

At the light-emitting stage T3, the first scan signal S1, the second scan signal S2, the third scan signal S3, and the sixth scan signal S6 are all at the low level, and the fourth scan signal S4 is at the high level. The drive transistor M0 generates a driving current in response to a voltage at the first gate G. Here, driving current $I=K*(V_{GS}-Vth0)^2=K*(Vref1-Vdata-Vth0)^2=K*(Vref1-Vdata-(Vref1-Vref2))^2=K*(Vref2-Vdata)^2$. K is related to the size and mobility of the drive transistor M0, and is determined by a manufacturing process. Vdata and Vref2 are both set values.

Therefore, it can be seen that the pixel circuit provided in this embodiment of the present application suppresses a drift of the threshold voltage of the drive transistor M0 in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

On the basis of the above embodiments, a magnitude relationship between the first reference voltage Vref1, the second reference voltage Vref2, the first power voltage VDD, and the second power voltage VSS is similar to that in the preceding embodiment, and details are not described herein again.

Figure 9:
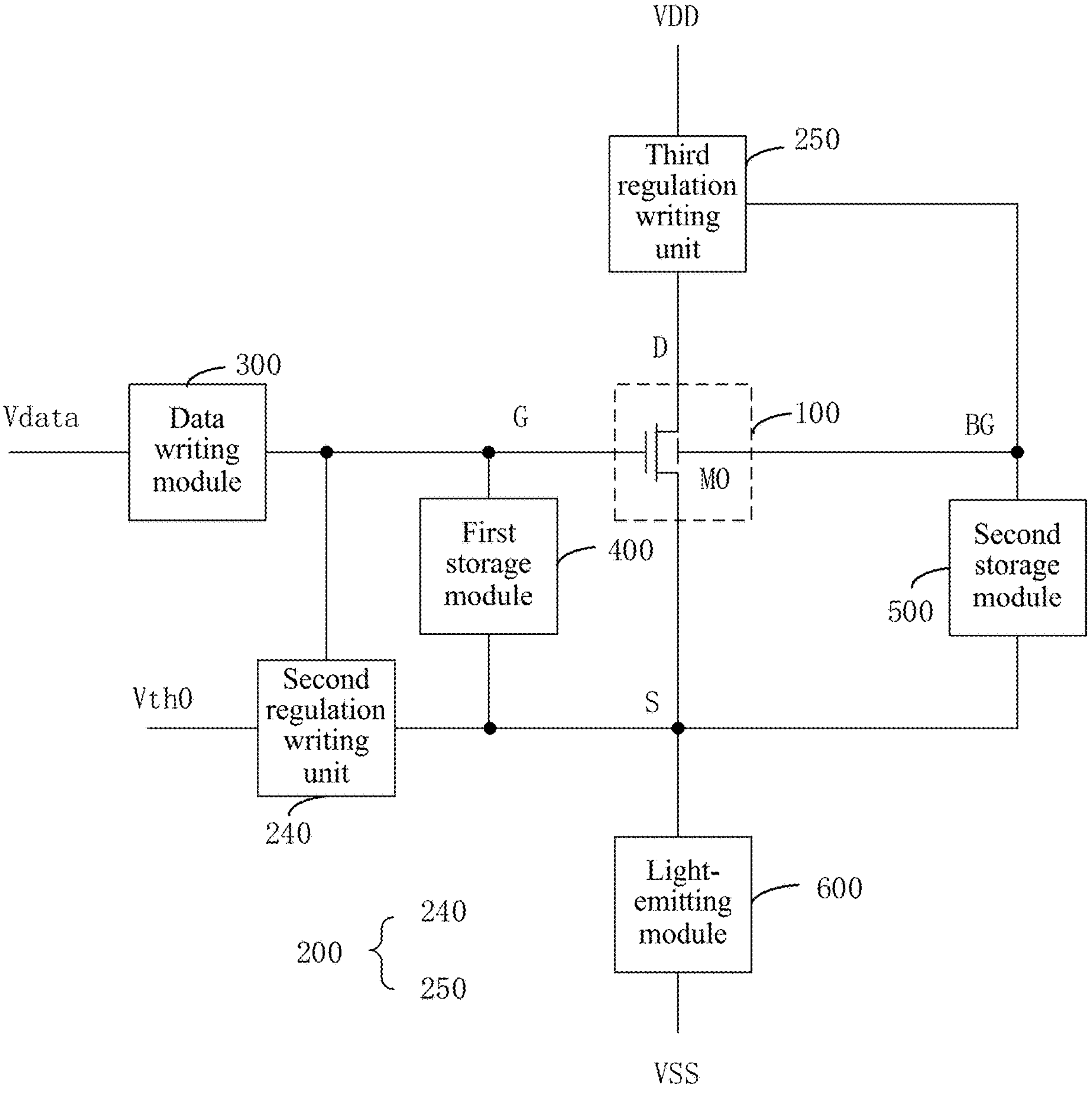
FIG. 9 is a schematic diagram of still another pixel circuit according to an embodiment of the present application.

FIG. 9 is a schematic diagram of still another pixel circuit according to an embodiment of the present application. Referring to FIG. 9, in an embodiment of the present application, the threshold voltage regulation module 200 includes: a second regulation writing unit 240 and a third regulation writing unit 250.

The second regulation writing unit 240 is electrically connected to the first gate G of the drive transistor M0, and electrically connected to the first electrode (source S) of the drive transistor M0. The second regulation writing unit 240 is configured to write a preset threshold voltage Vth0 into the drive transistor M0. For example, the preset threshold voltage Vth0 is stored in the form of a voltage difference between the first gate G and the source S of the drive transistor M0. That is, a voltage difference $V_{GS}$ between the first gate G and the source S of the drive transistor M0 is Vth0.

The third regulation writing unit 250 is electrically connected to the second electrode (drain D) of the drive transistor M0, and electrically connected to the second gate BG of the drive transistor M0. The third regulation writing unit 250 is configured to write a first fixed voltage V1 into the second gate BG, and write a first power voltage VDD into the second electrode (drain D) of the drive transistor M0. The first power voltage VDD is reused as the first fixed voltage V1.

A working principle of the threshold voltage regulation module 200 is as follows: The second regulation writing unit 240 writes a preset threshold voltage Vth0 into the drive transistor M0, and a voltage difference $V_{GS}$ between the first gate G and the source S of the drive transistor M0 is Vth0. The third regulation writing unit 250 writes a first power voltage VDD into the second gate BG, and the voltage difference $V_{BS}$ between the second gate BG and the source S of the drive transistor M0 is VDD-Vth0, and a value of the voltage difference is determined based on a configuration mode of the second regulation writing unit 240.

For example, the preset threshold voltage Vth0 written into the drive transistor M0 is preset to 0 V, that is, $V_{GS}$=Vth0=0 V. The voltage difference $V_{BS}$ written between the second gate BG and the source S of the drive transistor M0 is preset to 4 V, that is, $V_{BS}$=4 V. With reference to FIG. 2, $V_{BS}$=4 V corresponds to the first characteristic curve from left to right. In addition, the voltage difference $V_{GS}$=0 V, and the drive transistor M0 is in an on state. The second gate BG is discharged through the drive transistor M0 that is self-conducting, the voltage difference $V_{BS}$ is reduced, and the characteristic curve corresponding to the drive transistor M0 shifts to the right, corresponding to the second characteristic curve from left to right. In addition, the voltage difference $V_{GS}$=0 V, and the drive transistor M0 is still in the on state, until the voltage difference $V_{BS}$=0 V, corresponding to the fifth characteristic curve from left to right. The voltage difference $V_{GS}$=0 V, and the drive transistor M0 is no longer turned on and the second gate BG no longer discharges. Therefore, when the drive transistor M0 is turned off, voltage difference $V_{BS}$=preset threshold voltage Vth0. In this case, a threshold voltage of the drive transistor M0 is the preset threshold voltage Vth0. The threshold voltage regulation module 200 can implement a function of regulating the threshold voltage Vth of the drive transistor M0.

Still referring to FIG. 9, configuration modes of the first storage module 400, the second storage module 500, and the data writing module 300 are similar to those in the preceding embodiment. For example, the data writing module 300 has two configuration modes, that is, the data writing module 300 is electrically connected to the first gate G, or the data writing module 300 is electrically connected to the first electrode (source S) of the drive transistor M0. The method for driving a pixel circuit shown in FIG. 9 is described below using an example in which the data writing module 300 is electrically connected to the first gate G.

For example, the method for driving a pixel circuit includes: a threshold regulation stage, a data writing stage, and a light-emitting stage, where the threshold regulation stage includes a first sub-stage and a second sub-stage.

At the first sub-stage of the threshold regulation stage, the second regulation writing unit 240 writes a preset threshold voltage Vth0 into the drive transistor M0. The third regulation writing unit 250 writes a first power voltage VDD into the second gate BG and the second electrode (source D) of the drive transistor M0.

At the second sub-stage of the threshold regulation stage, the second regulation writing unit 240 continuously writes the preset threshold voltage Vth0 into the drive transistor M0 and keeps the preset threshold voltage unchanged. The first power voltage VDD is no longer written into the second gate BG and the second electrode (source D) of the drive transistor M0, but the second gate BG and the second electrode (source D) of the drive transistor M0 are still turned on, and the drive transistor M0 is self-conducting, to regulate the threshold voltage Vth of the drive transistor M0 to the preset threshold voltage Vth0.

At the data writing stage, the data writing module 300 writes a data voltage Vdata into the first gate G. A writing mode of the data voltage Vdata is determined based on a configuration mode of the second regulation writing unit 240.

At the light-emitting stage, the drive module 100 generates a driving current in response to a voltage at the first gate G. Here, driving current $I=K^*(V_{GS}-Vth0)^2=K^*(Vdata-V_S-Vth0)^2$. K is related to the size and mobility of the drive transistor M0, and is determined by a manufacturing process. Vdata, $V_S$, and Vth0 are all set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0. The driving current output is relatively stable, to improve the display picture quality of the display panel.

Figure 10:
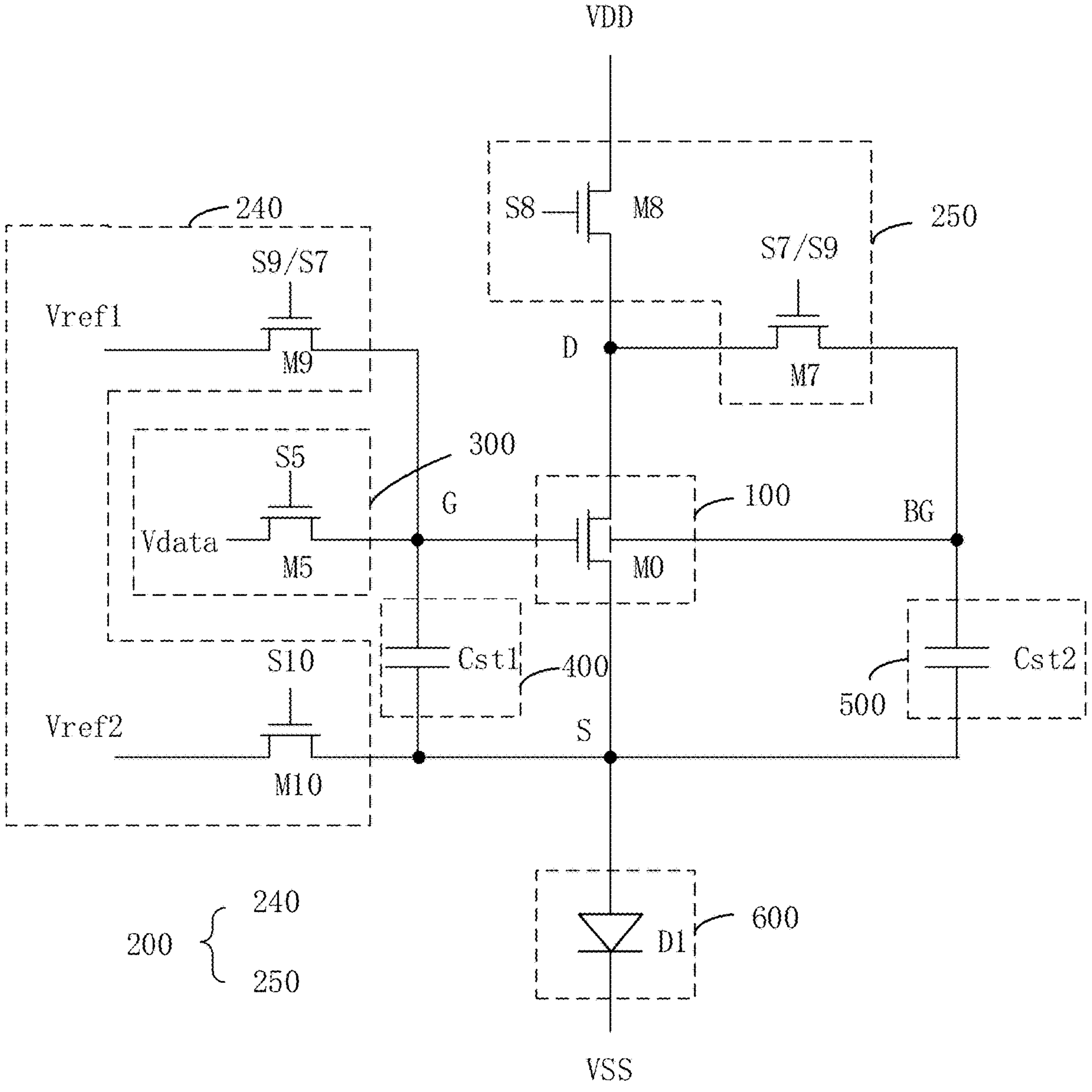
FIG. 10 is a schematic diagram of still another pixel circuit according to an embodiment of the present application.

On the basis of the above embodiments, configuration modes of the third regulation writing unit 250 and the second regulation writing unit 240 are described below, but are not used as a limitation on the present application. FIG. 10 is a schematic diagram of still another pixel circuit according to an embodiment of the present application. Referring to FIG. 10, in an embodiment of the present application, the third regulation writing unit 250 includes: a seventh transistor M7 and an eighth transistor M8.

A gate of the seventh transistor M7 is connected to a seventh scan signal S7. A first electrode of the seventh transistor M7 is electrically connected to the second gate BG. A second electrode of the seventh transistor M7 is electrically connected to the second electrode (drain D) of the drive transistor M0. A gate of the eighth transistor M8 is connected to an eighth scan signal S8. A first electrode of the eighth transistor M8 is electrically connected to the second electrode (drain D) of the drive transistor M0. A second electrode of the eighth transistor M8 is connected to the first power voltage VDD. Such arrangement ensures that a circuit structure of the third regulation writing unit 250 is simple and easy to implement.

Still referring to FIG. 10, in an embodiment of the present application, the second regulation writing unit 240 includes: a ninth transistor M9 and a tenth transistor M10. A gate of the ninth transistor M9 is connected to a ninth scan signal S9. A first electrode of the ninth transistor M9 is electrically connected to the first gate G. A second electrode of the ninth transistor M9 is connected to the first reference voltage Vref1. A gate of the tenth transistor M10 is connected to a tenth scan signal S10. A first electrode of the tenth transistor M10 is electrically connected to the first electrode (source S) of the drive transistor M0. A second electrode of the tenth transistor M10 is connected to the second reference voltage Vref2. A voltage difference between the first reference voltage Vref1 and the second reference voltage Vref2 is the preset threshold voltage Vth0. Such arrangement ensures that a circuit structure of the second regulation writing unit 240 is simple and easy to implement.

In one embodiment, the seventh scan signal S7 is reused as the ninth scan signal S9 to reduce a quantity of signal lines.

Figure 11:
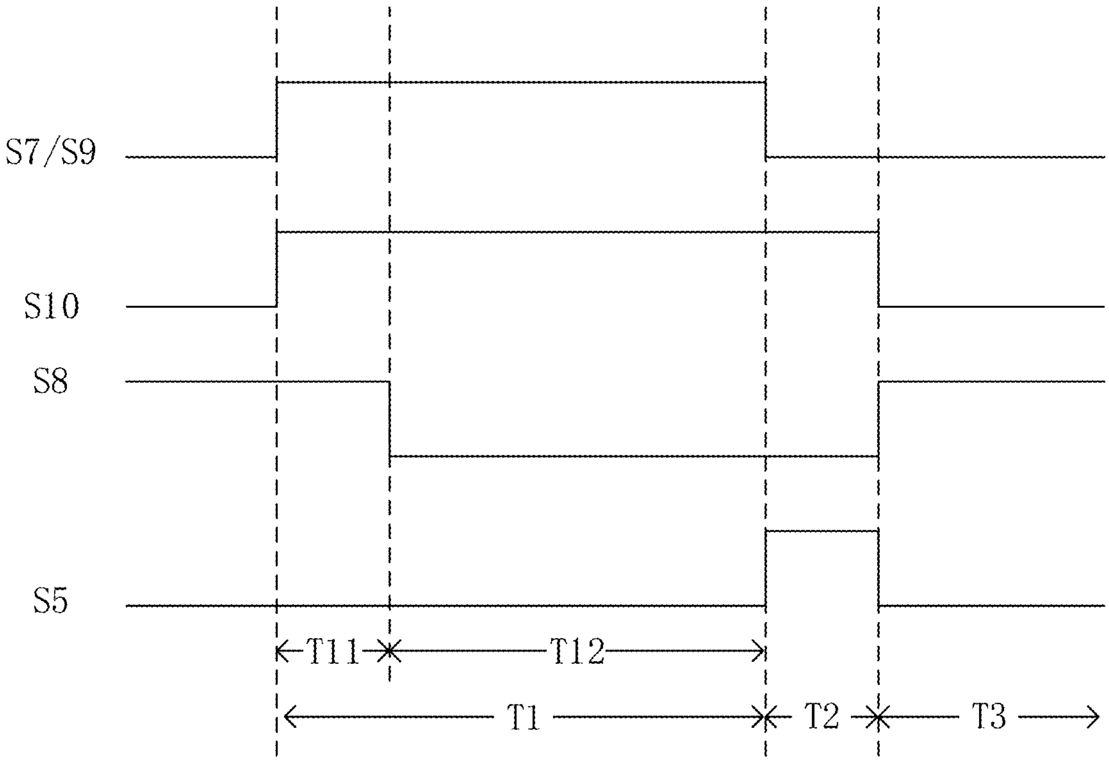
FIG. 11 is a schematic diagram of driving timing of still another pixel circuit according to an embodiment of the present application.

The driving method for a pixel circuit shown in FIG. 10 is described below with reference to driving timing. FIG. 11 is a schematic diagram of driving timing of still another pixel circuit according to an embodiment of the present application. With reference to FIG. 10 and FIG. 11, for example, the transistors are all N-type transistors. The driving method for a pixel circuit includes: a threshold regulation stage T1, a data writing stage T2, and a light-emitting stage T3, where the threshold regulation stage T1 includes a first sub-stage T11 and a second sub-stage T12.

At the first sub-stage T11 of the threshold regulation stage, the seventh scan signal S7 (ninth scan signal S9), the eighth scan signal S8, and the tenth scan signal S10 are all at a high level, and the fifth scan signal S5 is at a low level. The fifth transistor M5 is turned off under the control of the fifth scan signal S5, and the other transistors are all turned on, that is, the seventh transistor M7 to the tenth transistor M10 are all turned on. The ninth transistor M9 writes a first reference voltage Vref1 into the first gate G. The tenth transistor M10 writes a second reference voltage Vref2 into the first electrode (source S) of the drive transistor M0. The seventh transistor M7 and the eighth transistor M8 write a first power voltage VDD into the second gate BG. A voltage difference between the first gate G and the first electrode (source S) of the drive transistor M0 is $V_{GS}$=Vref1−Vref2, and a voltage difference between the second gate BG and the source S is $V_{BS}$=VDD−Vref2.

At the second sub-stage T12 of the threshold regulation stage T1, the eighth scan signal S8 is switched from the high level to the low level, and the other scan signals remain in a state of the first sub-stage T11. The fifth transistor M5 remains in an off state. The eighth transistor M8 is switched from the on state to the off state under the control of the eighth scan signal S8. The ninth transistor M9 continuously writes the first reference voltage Vref1 into the first gate G. The tenth transistor M10 continuously writes the second reference voltage Vref2 into the first electrode (source S) of the drive transistor M0. In this way, a voltage difference $V_{GS}$=Vref1−Vref2 is maintained between the first gate G and the first electrode (source S) of the drive transistor M0. The seventh transistor M7 is in an on state, connecting the second electrode (drain) and the second gate BG of the drive transistor M0. The drive transistor M0 is self-conducting, a voltage at the second gate BG of the drive transistor is discharged through the drive transistor M0, the voltage of the drive transistor is gradually reduced until the drive transistor M0 is turned off, and preset threshold voltage Vth0=voltage difference $V_{BS}$=Vref1−Vref2. This implements that the threshold voltage Vth of the drive transistor M0 is regulated to the preset threshold voltage Vth0.

At the data writing stage T2, the seventh scan signal S7 (ninth scan signal S9) and the eighth scan signal S8 are at the low level, and the tenth scan signal S10 and the fifth scan signal S5 are at the high level. The fifth transistor M5 is turned on under the control of the fifth scan signal S5, to write a data voltage Vdata into the first gate G. The tenth transistor M10 is turned on and writes the second reference voltage Vref2 into the first electrode (source S) of the drive transistor M0. This ensures that at the light-emitting stage T3, voltage difference $V_{GS}$=Vdata−Vref2.

At the light-emitting stage T3, the seventh scan signal S7 (ninth scan signal S9), the tenth scan signal S10, and the fifth scan signal S5 are all at the low level, and the eighth scan signal S8 is at the high level. The eighth transistor M8 is turned on, and the drive transistor M0 generates a driving current in response to a voltage at the first gate G. Here, driving current $I=K*(V_{GS}-Vth0)^2=K*(Vdata-Vref2-Vth0)^2=K*(Vdata-Vref2-(Vref1-Vref2))^2=K*(Vdata-Vref1)^2$. K is related to the size and mobility of the drive transistor M0, and is determined by a manufacturing process. Vdata and Vref1 are both set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

In another embodiment of the present application, the seventh scan signal S7 and the ninth scan signal S9 are provided separately. At the second sub-stage T12 of the threshold regulation stage T1, the eighth scan signal S8, the ninth scan signal S9, and the tenth scan signal S10 may alternatively be configured to be switched from the high level to the low level, and the other scan signals remain in a state of the first sub-stage T11. The fifth transistor M5 remains in an off state. The eighth transistor M8 is switched from the on state to the off state under the control of the eighth scan signal S8. The ninth transistor M9 and the tenth transistor M10 are switched from the on state to the off state. The voltage difference $V_{GS}$ between the first gate G and the first electrode (source S) of the drive transistor M0 is maintained by the first capacitor Cst1. The seventh transistor M7 is in an on state, connecting the second electrode (drain) and the second gate BG of the drive transistor M0. The drive transistor M0 is self-conducting, a voltage at the second gate BG of the drive transistor is discharged through the drive transistor M0, the voltage of the drive transistor is gradually reduced until the drive transistor M0 is turned off, and preset threshold voltage Vth0=voltage difference $V_{BS}$=Vref1−Vref2. This implements that the threshold voltage Vth of the drive transistor M0 is regulated to the preset threshold voltage Vth0.

In another embodiment of the present application, unlike the pixel circuit shown in FIG. 10, the seventh scan signal S7 and the ninth scan signal S9 are provided separately. The data writing module 300 is electrically connected to the first electrode (source S) of the drive transistor M0. The data writing module 300 is configured to write a data voltage Vdata into the first electrode (source S) of the drive transistor M0. Correspondingly, at the data writing stage, the data writing module 300 writes a data voltage Vdata into the first electrode (source S) of the drive transistor M0. The ninth transistor M9 writes a first reference voltage Vref1 into the first gate G to ensure that at the light-emitting stage, voltage difference $V_{GS}$=Vref1−Vdata.

On the basis of the above embodiments, a magnitude relationship between the first reference voltage Vref1, the second reference voltage Vref2, the first power voltage VDD, and the second power voltage VSS is similar to that in the preceding embodiment, and details are not described herein again.

Figure 12:
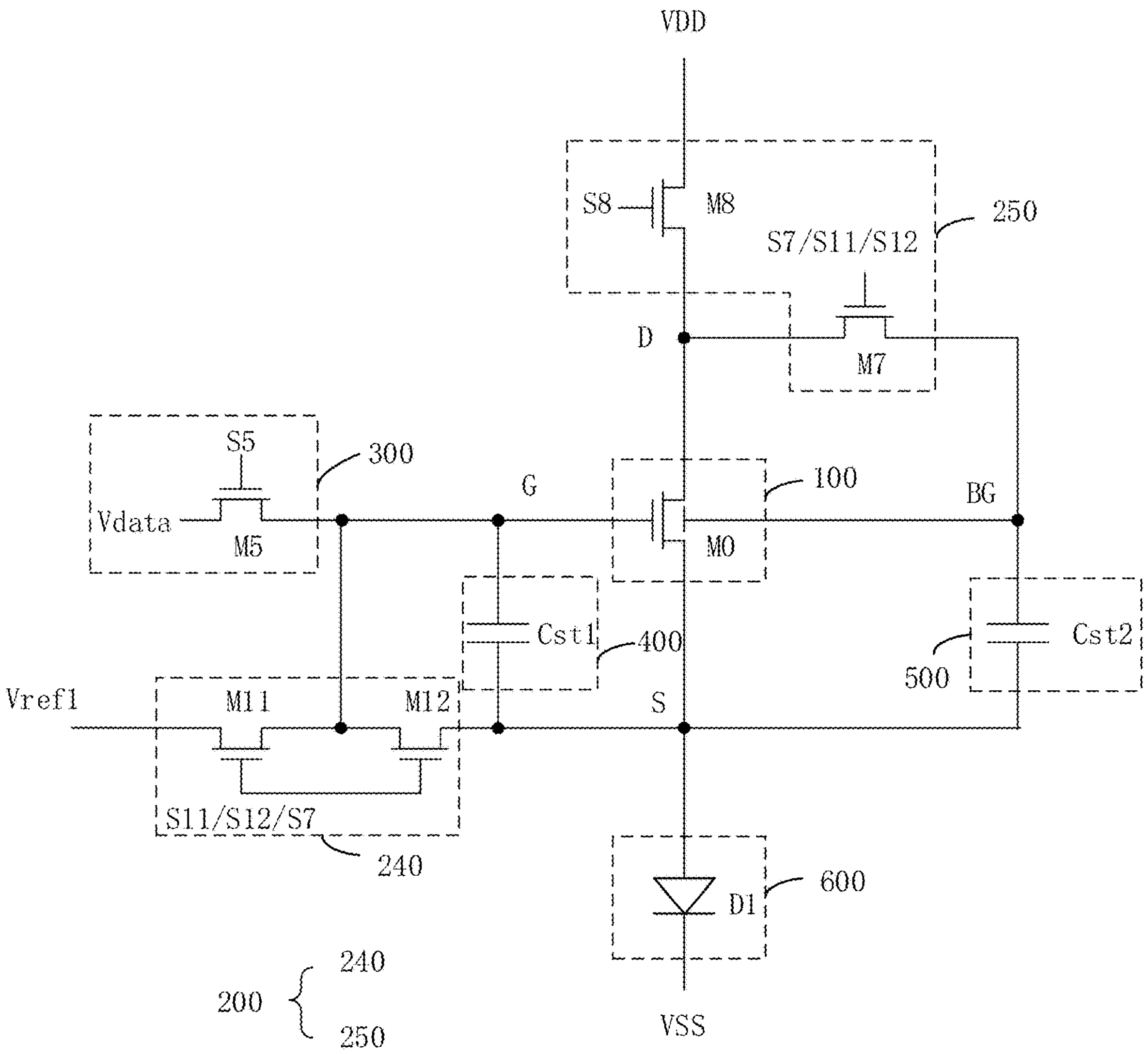
FIG. 12 is a schematic diagram of still another pixel circuit according to an embodiment of the present application.

FIG. 12 is a schematic diagram of still another pixel circuit according to an embodiment of the present application. Referring to FIG. 12, unlike FIG. 10, the second regulation writing unit 240 includes: an eleventh transistor M11 and a twelfth transistor M12. A gate of the eleventh transistor M11 is connected to an eleventh scan signal S11. A first electrode of the eleventh transistor M11 is electrically connected to the first gate G. A second electrode of the eleventh transistor M11 is connected to the first reference voltage Vref1. A gate of the twelfth transistor M12 is connected to a twelfth scan signal S12. A first electrode of the twelfth transistor M12 is electrically connected to the first electrode (source S) of the drive transistor M0. A second electrode of the twelfth transistor M12 is electrically connected to the first electrode of the eleventh transistor M11. The preset threshold voltage Vth0 is 0. In one embodiment, the eleventh scan signal S11 is reused as the twelfth scan signal S12 to reduce a quantity of signal lines.

Figure 13:
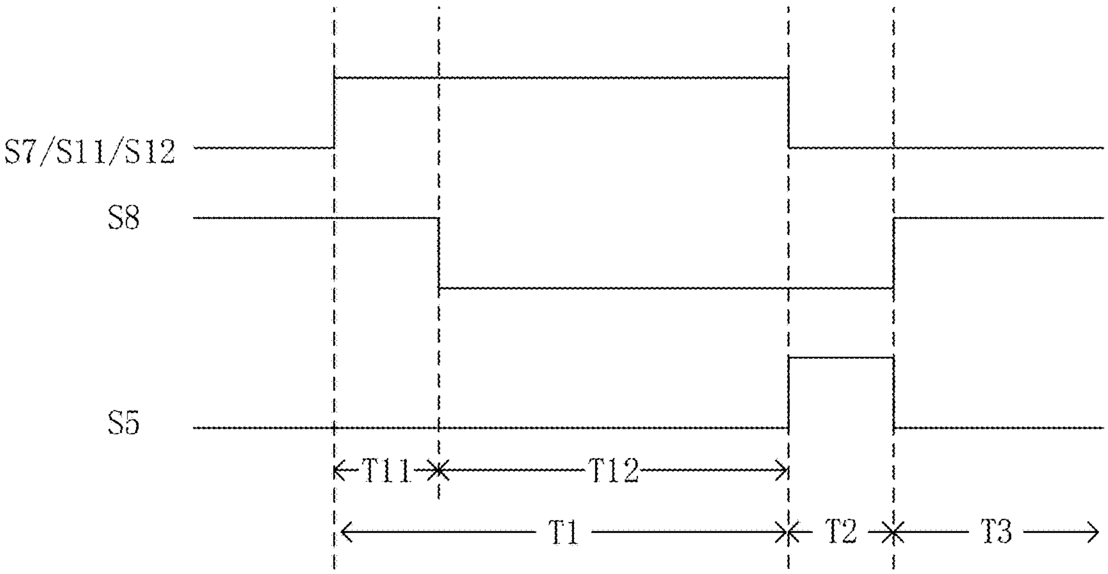
FIG. 13 is a schematic diagram of driving timing of still another pixel circuit according to an embodiment of the present application.

The method for driving a pixel circuit shown in FIG. 12 is described below with reference to driving timing. FIG. 13 is a schematic diagram of driving timing of still another pixel circuit according to an embodiment of the present application. With reference to FIG. 12 and FIG. 13, for example, the transistors are all N-type transistors. The driving method for a pixel circuit includes: a threshold regulation stage T1, a data writing stage T2, and a light-emitting stage T3, where the threshold regulation stage T1 includes a first sub-stage T11 and a second sub-stage T12.

At the first sub-stage T11 of the threshold regulation stage, the seventh scan signal S7 (eleventh scan signal S11/twelfth scan signal S12) and the eighth scan signal S8 are both at a high level, and the fifth scan signal S5 is at a low level. The fifth transistor M5 is turned off under the control of the fifth scan signal S5, and the other transistors are all turned on, that is, the seventh transistor M7, the eighth transistor M8, the eleventh transistor M11, and the twelfth transistor M12 are all turned on. The eleventh transistor M11 writes a first reference voltage Vref1 into the first gate G. The twelfth transistor M12 writes the first reference voltage Vref1 into the first electrode (source S) of the drive transistor M0. The seventh transistor M7 and the eighth transistor M8 write a first power voltage VDD into the second gate BG. A voltage difference between the first gate G and the first electrode (source S) of the drive transistor M0 is $V_{GS}$=0 V, and a voltage difference between the second gate BG and the source S is $V_{BS}$=VDD−Vref1.

At the second sub-stage T12 of the threshold regulation stage T1, the eighth scan signal S8 is switched from the high level to the low level, and the other scan signals remain in a state of the first sub-stage T11. The fifth transistor M5 remains in an off state. The eighth transistor M8 is switched from the on state to the off state under the control of the eighth scan signal S8. The eleventh transistor M11 and the twelfth transistor M12 continuously write the first reference voltage Vref1 into the first gate G and the first electrode (source S) of the drive transistor M0. In this way, the voltage difference $V_{GS}$=0 V is maintained between the first gate G and the first electrode (source S) of the drive transistor M0. The seventh transistor M7 is in an on state, connecting the second electrode (drain) and the second gate BG of the drive transistor M0. The drive transistor M0 is self-conducting, a voltage at the second gate BG of the drive transistor is discharged through the drive transistor M0, the voltage of the drive transistor is gradually reduced until the drive transistor M0 is turned off, and preset threshold voltage Vth0=voltage difference $V_{BS}$=0 V. This implements that the threshold voltage Vth of the drive transistor M0 is regulated to the preset threshold voltage Vth0.

At the data writing stage T2, the seventh scan signal S7 (eleventh scan signal S11/twelfth scan signal S12) and the eighth scan signal S8 are at the low level, and the fifth scan signal S5 is at the high level. The fifth transistor M5 is turned on under the control of the fifth scan signal S5, to write a data voltage Vdata into the first gate G, and a voltage at the first gate G is increased by Vdata−Vref1. Meanwhile, due to a coupling effect of a first capacitor Cst1 and a parasitic capacitor Cd1 of a light-emitting device D1, a voltage at the first electrode (source S) of the drive transistor M0 is increased by a rise amount of (Vdata−Vref1)*[Cst1/(Cst1+Cd1)]. In this case, the voltage difference between the first gate G of the drive transistor M0 and the first electrode (source S) of the drive transistor M0 is $V_{GS}$=Vref1+(Vdata−Vref1)*[Cst1/(Cst1+Cd1)]. Similarly, due to the coupling effect of a second capacitor Cst2, a voltage rise amount of the second gate BG is equal to a voltage rise amount of the first electrode (source S), and the voltage difference $V_{BS}$ is kept consistent with that in the previous stage. Therefore, the threshold voltage of the drive transistor M0 is kept consistent with that in the previous stage.

At the light-emitting stage T3, the seventh scan signal S7 (eleventh scan signal S11/twelfth scan signal S12) and the fifth scan signal S5 are both at the low level, and the eighth scan signal S8 is at the high level. The eighth transistor M8 is turned on, and the drive transistor M0 generates a driving current in response to a voltage at the first gate G.

Here, driving current $I = K*(V_{GS} - Vth0)^2$ a. $= K*\left(Vdata - \{Vref1 + (Vdata - Vref1)*[Cst1/(Cst1 + Cd1)]\}\right)^2$ b. $= K*[(Vdata - Vref1)*Cd1/(Cst1 + Cd1)]^2$ c. K is related to the size and mobility of the drive transistor M0, and is determined by a manufacturing process. Vdata and Vref1 are both set values. Cst1 and Cd1 are both capacitance values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

In another embodiment of the present application, unlike the pixel circuit shown in FIG. 12, the eleventh scan signal S11 and the twelfth scan signal S12 are provided separately. The data writing module 300 is electrically connected to the first electrode (source S) of the drive transistor M0. The data writing module 300 is configured to write a data voltage Vdata into the first electrode (source S) of the drive transistor M0. At the data writing stage, the data writing module 300 writes a data voltage Vdata into the first electrode (source S) of the drive transistor M0. The eleventh transistor M11 writes a first reference voltage Vref1 into the first gate G to ensure that at the light-emitting stage, voltage difference $V_{GS}$=Vref1−Vdata.

Figure 14:
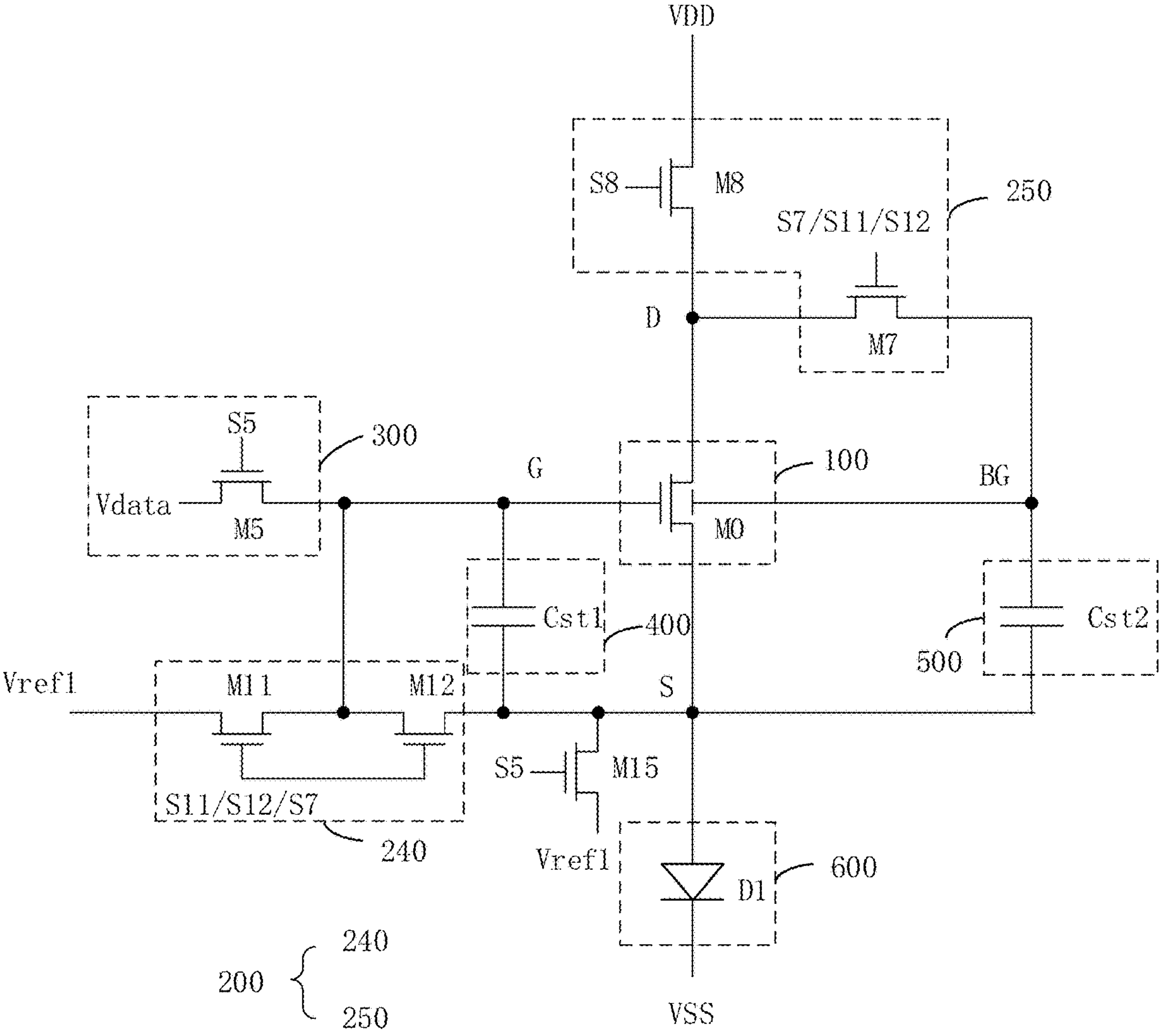
FIG. 14 is a schematic diagram of still another pixel circuit according to an embodiment of the present application.

FIG. 14 is a schematic diagram of still another pixel circuit according to an embodiment of the present application. Referring to FIG. 14, in another embodiment of the present application, unlike the pixel circuit shown in FIG. 12, the pixel circuit further includes a fifteenth transistor M15. A gate of the fifteenth transistor M15 is connected to the fifth scan signal S5. A first electrode of the fifteenth transistor M15 is connected to the first reference voltage Vref1. A second electrode of the fifteenth transistor M15 is electrically connected to the second electrode of the first capacitor Cst1, that is, the second electrode of the fifteenth transistor M15 is electrically connected to the first electrode (source S) of the drive transistor M0. The fifteenth transistor M15 and the fifth transistor M5 are both controlled by the fifth scan signal S5. The fifteenth transistor M15 and the fifth transistor M5 are turned on simultaneously in a driving process of the pixel circuit. In this case, the data voltage Vdata is written into the first electrode of the first capacitor Cst1, and the first reference voltage Vref1 is written into the second electrode of the first capacitor Cst1, and voltage shift caused by the second electrode of the first capacitor Cst1 in a floating state can be avoided, to facilitate rapid writing of the data voltage Vdata.

On the basis of the above embodiments, a magnitude relationship between the first reference voltage Vref1, a first power voltage VDD, and a second power voltage VSS is similar to that in the preceding embodiment, and details are not described herein again.

Figure 15:
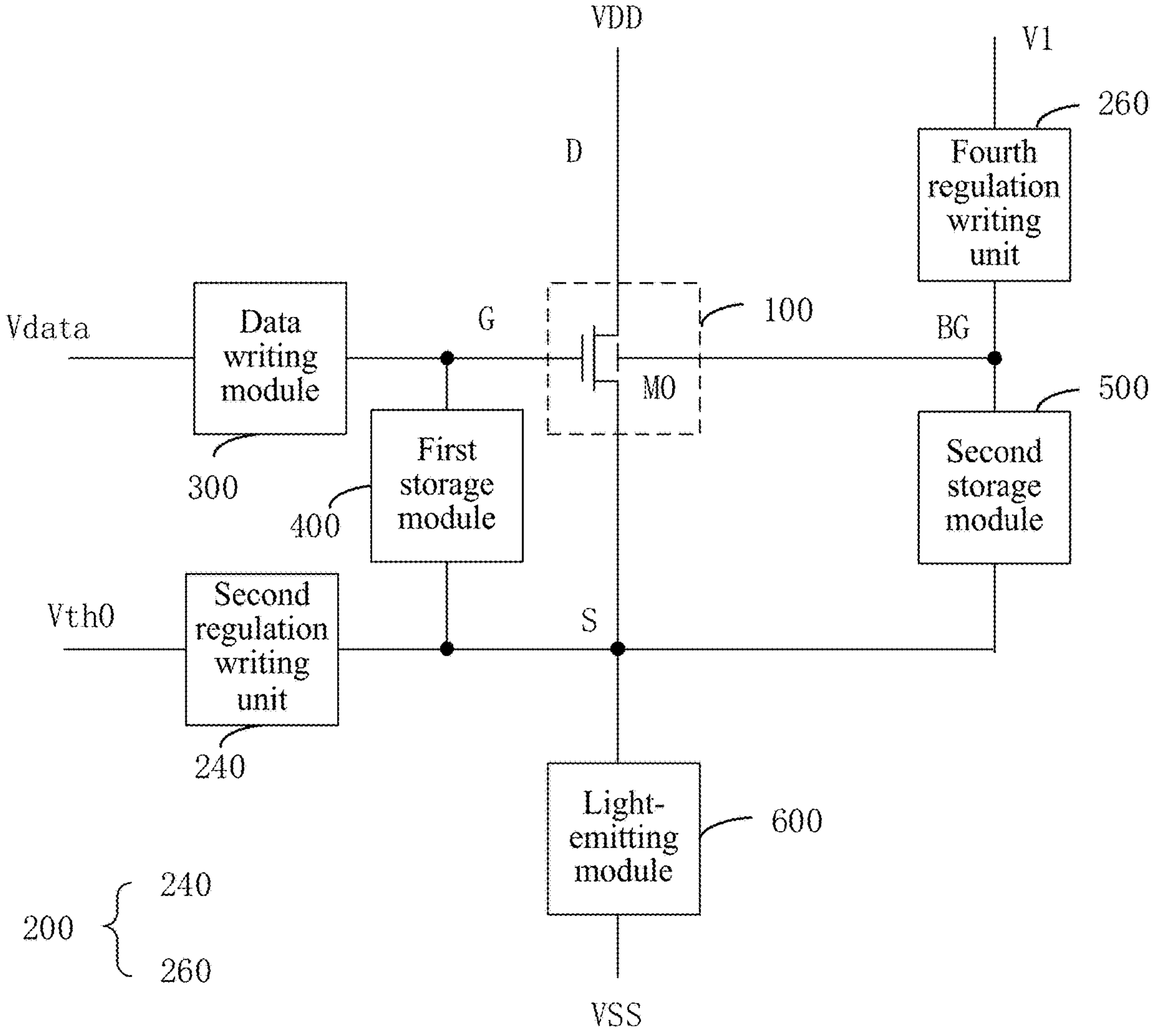
FIG. 15 is a schematic diagram of still another pixel circuit according to an embodiment of the present application.

FIG. 15 is a schematic diagram of still another pixel circuit according to an embodiment of the present application. Referring to FIG. 15, in an embodiment of the present application, unlike the preceding embodiments, the threshold voltage regulation module 200 includes: a second regulation writing unit 240 and a fourth regulation writing unit 260. The fourth regulation writing unit 260 is electrically connected to the second gate BG of the drive transistor M0. The fourth regulation writing unit 260 is configured to write a first fixed voltage V1 into the second gate BG.

A working principle of the threshold voltage regulation module 200 is as follows: The second regulation writing unit 240 writes a preset threshold voltage Vth0 into the drive transistor M0, and a voltage difference $V_{GS}$ between the first gate G and the source S of the drive transistor M0 is Vth0. The fourth regulation writing unit 260 writes a first fixed voltage V1 into the second gate BG, and a voltage difference $V_{BS}$ between the second gate BG and the source S of the drive transistor M0 is V1−Vth0, and a value of the voltage difference is determined based on a configuration mode of the second regulation writing unit 240.

For example, the preset threshold voltage Vth0 written into the drive transistor M0 is 0 V, that is, $V_{GS}$=Vth0=0 V. The voltage difference $V_{BS}$ written between the second gate BG and the source S of the drive transistor M0 is preset to 4 V, that is, $V_{BS}$=4 V. With reference to FIG. 2, $V_{BS}$=4 V corresponds to the first characteristic curve from left to right. In addition, the voltage difference $V_{GS}$=0 V, and the drive transistor M0 is in an on state. The second gate BG is discharged through the drive transistor M0 that is self-conducting, the voltage difference $V_{BS}$ is reduced, and the characteristic curve corresponding to the drive transistor M0 shifts to the right, corresponding to the second characteristic curve from left to right. In addition, the voltage difference $V_{GS}$=0 V, and the drive transistor M0 is still in the on state, until the voltage difference $V_{BS}$=0 V, corresponding to the fifth characteristic curve from left to right. The voltage difference $V_{GS}$=0 V, and the drive transistor M0 is no longer turned on and the second gate BG no longer discharges. Therefore, when the drive transistor M0 is turned off, voltage difference $V_{BS}$=preset threshold voltage Vth0. The threshold voltage regulation module 200 can implement a function of regulating the threshold voltage Vth of the drive transistor M0.

It should be noted that in this embodiment of the present application, the values of the preset threshold voltage Vth0 and the first fixed voltage V1 that are written into the drive transistor M0 are further set to ensure that at the threshold voltage regulation stage, although the first electrode (source S) of the drive transistor M0 is connected to the light-emitting module 600 and the drive transistor M0 is in an on state, the voltage difference between the first electrode (source S) of the drive transistor M0 and the second power voltage VSS is less than the turn-on voltage of the light-emitting module 600.

Still referring to FIG. 15, configuration modes of the first storage module 400, the second storage module 500, and the data writing module 300 are similar to those in the preceding embodiment. For example, the data writing module 300 has two configuration modes, that is, the data writing module 300 is electrically connected to the first gate G, or the data writing module 300 is electrically connected to the first electrode (source S) of the drive transistor M0. The method for driving a pixel circuit shown in FIG. 15 is described below using an example in which the data writing module 300 is electrically connected to the first gate G.

For example, the method for driving a pixel circuit includes: a threshold regulation stage, a data writing stage, and a light-emitting stage, where the threshold regulation stage includes a first sub-stage and a second sub-stage.

At the first sub-stage of the threshold regulation stage, the second regulation writing unit 240 writes a preset threshold voltage Vth0 into the drive transistor M0. The fourth regulation writing unit 260 writes a first fixed voltage V1 into the second gate BG.

At the second sub-stage of the threshold regulation stage, the drive transistor M0 is self-conducting, to regulate the threshold voltage Vth of the drive transistor M0 to the preset threshold voltage Vth0.

At the data writing stage, the data writing module 300 writes a data voltage Vdata into the first gate G. A writing mode of the data voltage Vdata is determined based on a configuration mode of the second regulation writing unit 240.

At the light-emitting stage, the drive module 100 generates a driving current in response to a voltage at the first gate G. Here, driving current $I=K*(V_{GS}-Vth0)^2=K*(Vdata-V_S-Vth0)^2$. K is related to the size and mobility of the drive transistor M0, and is determined by a manufacturing process. Vdata, $V_S$, and Vth0 are all set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0. The driving current output is relatively stable, to improve the display picture quality of the display panel.

In the above embodiment, a configuration mode of the second regulation writing unit 240 is similar to that in the preceding embodiments, and details are not described again.

Figure 16:
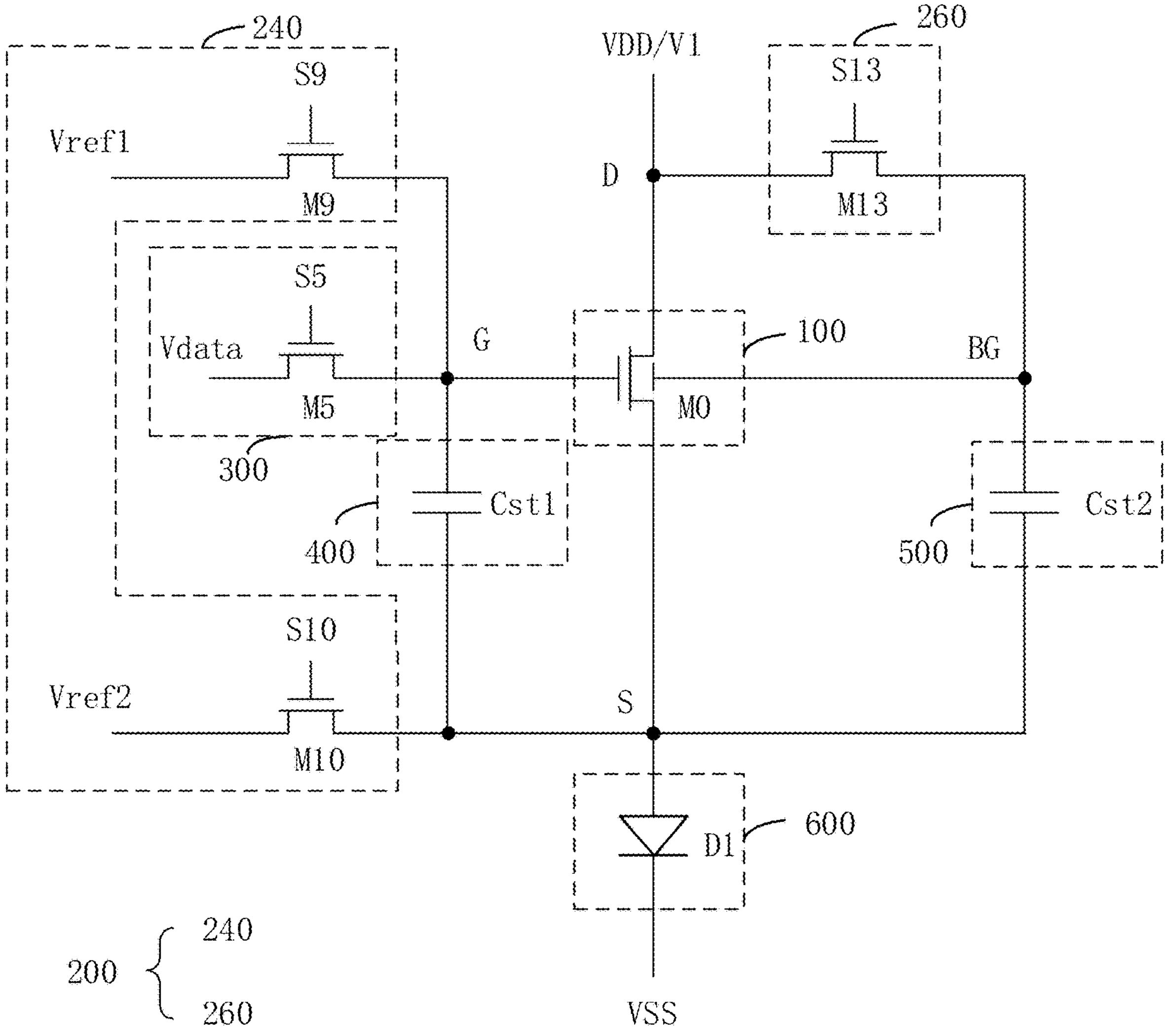
FIG. 16 is a schematic diagram of still another pixel circuit according to an embodiment of the present application.

On the basis of the above embodiments, a configuration mode of the fourth regulation writing unit 260 is described below, but is not used as a limitation on the present application. FIG. 16 is a schematic diagram of still another pixel circuit according to an embodiment of the present application. Referring to FIG. 16, in an embodiment of the present application, the second electrode (drain D) of the drive transistor M0 is connected to the first power voltage VDD, and the first power voltage VDD is reused as the first fixed voltage V1 to reduce a quantity of signal lines.

Still referring to FIG. 16, in an embodiment of the present application, the fourth regulation writing unit 260 includes a thirteenth transistor M13, where a gate of the thirteenth transistor M13 is connected to a thirteenth scan signal S13, a first electrode of the thirteenth transistor M13 is electrically connected to the second gate BG, and a second electrode of the thirteenth transistor M13 is connected to the first fixed voltage V1.

Figure 17:
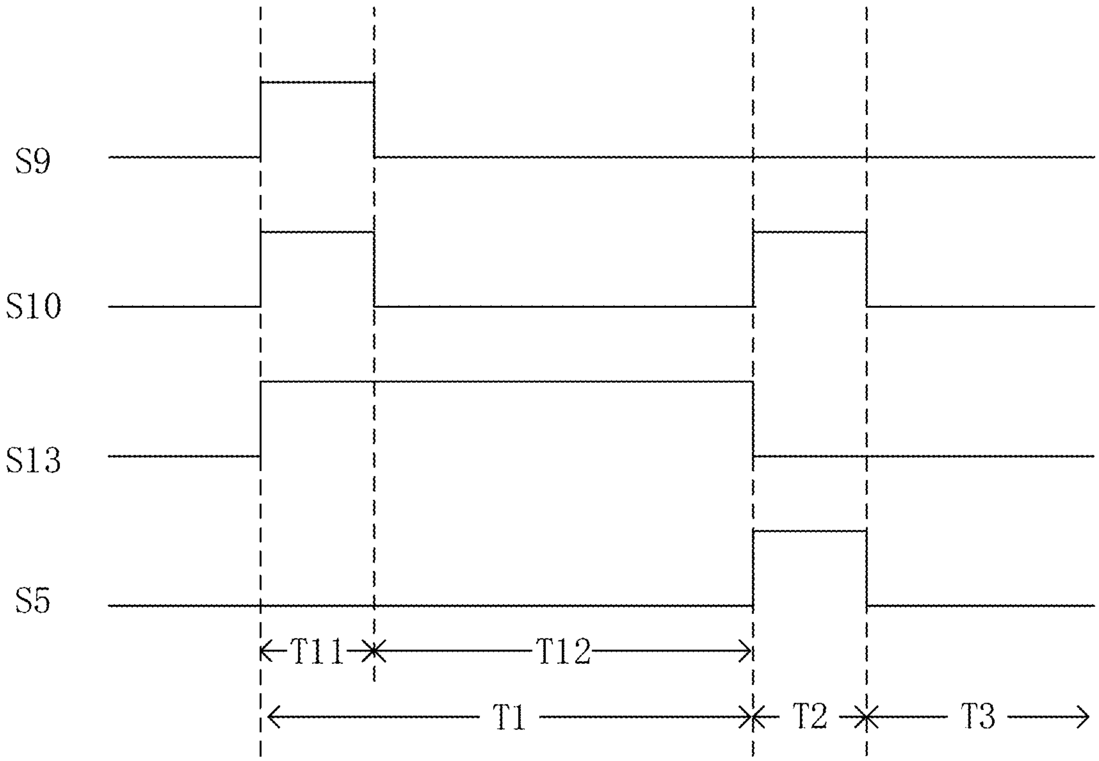
FIG. 17 is a schematic diagram of driving timing of still another pixel circuit according to an embodiment of the present application.

The driving method for a pixel circuit shown in FIG. 16 is described below with reference to driving timing. FIG. 17 is a schematic diagram of driving timing of still another pixel circuit according to an embodiment of the present application. With reference to FIG. 16 and FIG. 17, for example, the transistors are all N-type transistors. The driving method for a pixel circuit includes: a threshold regulation stage T1, a data writing stage T2, and a light-emitting stage T3, where the threshold regulation stage T1 includes a first sub-stage T11 and a second sub-stage T12.

At the first sub-stage T11 of the threshold regulation stage, the ninth scan signal S9, the tenth scan signal S10, and the thirteenth scan signal S13 are all at a high level and the fifth scan signal S5 is at a low level. The fifth transistor M5 is turned off under the control of the fifth scan signal S5, and the other transistors are turned on, that is, the ninth transistor M9, the tenth transistor M10, and the thirteenth transistor M13 are all turned on. The ninth transistor M9 writes a first reference voltage Vref1 into the first gate G. The tenth transistor M10 writes a second reference voltage Vref2 into the first electrode (source S) of the drive transistor M0. The thirteenth transistor M13 writes a first power voltage VDD into the second gate BG. A voltage difference between the first gate G and the first electrode (source S) of the drive transistor M0 is $V_{GS}$=Vref1–Vref2, and a voltage difference between the second gate BG and the source S is $V_{BS}$=VDD–Vref2.

At the second sub-stage T12 of the threshold regulation stage T1, the ninth scan signal S9 and the tenth scan signal S10 are switched from the high level to the low level, and the other scan signals remain in a state of the first sub-stage T11. The fifth transistor M5 remains in an off state. The ninth transistor M9 is switched from the on state to the off state under the control of the ninth scan signal S9. The tenth transistor M10 is switched from the on state to the off state under the control of the tenth scan signal S10. The voltage difference $V_{GS}$ between the first gate G and the first electrode (source S) of the drive transistor M0 is maintained by the first capacitor Cst1. The thirteenth transistor M13 is in an on state, connecting the second electrode (drain) and the second gate BG of the drive transistor M0. The drive transistor M0 is self-conducting, a voltage at the second gate BG of the drive transistor is discharged through the drive transistor M0, the voltage of the drive transistor is gradually reduced until the drive transistor M0 is turned off, and preset threshold voltage Vth0=voltage difference $V_{BS}$=Vref1–Vref2. This implements that the threshold voltage Vth of the drive transistor M0 is regulated to the preset threshold voltage Vth0.

At the data writing stage T2, the ninth scan signal S9 and the thirteenth scan signal S13 are at the low level, and the tenth scan signal S10 and the fifth scan signal S5 are both at the high level. The fifth transistor M5 is turned on under the control of the fifth scan signal S5, to write a data voltage Vdata into the first gate G. The tenth transistor M10 is turned on and writes the second reference voltage Vref2 into the first electrode (source S) of the drive transistor M0. This ensures that at the light-emitting stage T3, voltage difference $V_{GS}$=Vdata–Vref2.

At the light-emitting stage T3, the ninth scan signal S9, the tenth scan signal S10, the thirteenth scan signal S13, and the fifth scan signal S5 are all at the low level. The drive transistor M0 generates a driving current in response to a voltage at the first gate G. Here, driving current $$a.\ 1 = K*(V_{GS} - Vth0)^2 = K*(Vdata - Vref2 - Vth0)^2$$

$$b.\ = K*(Vdata - Vref2 - (Vref1 - Vref2))^2$$

c. =K*(Vdata–Vref1)$^2$. K is related to the size and mobility of the drive transistor M0, and is determined by a manufacturing process. Vdata and Vref1 are both set values.

Therefore, it can be seen that the pixel circuit provided in this embodiment of the present application suppresses a drift of the threshold voltage of the drive transistor in the pixel circuit, and is slightly affected by a threshold voltage fluctuation of the drive transistor M0, and slightly affected by a fluctuation of a first power voltage VDD. The driving current output is relatively stable, to improve the display picture quality of the display panel.

In another embodiment of the present application, unlike the pixel circuit shown in FIG. 16, the data writing module 300 is electrically connected to the first electrode (source S) of the drive transistor M0. The data writing module 300 is configured to write a data voltage Vdata into the first electrode (source S) of the drive transistor M0. Correspondingly, at the data writing stage, the data writing module 300 writes a data voltage Vdata into the first electrode (source S) of the drive transistor M0. The ninth transistor M9 writes a first reference voltage Vref1 into the first gate G to ensure that at the light-emitting stage, voltage difference $V_{GS}$=Vref1–Vdata.

On the basis of the above embodiments, a magnitude relationship between the first reference voltage Vref1, the second reference voltage Vref2, the first power voltage VDD, and the second power voltage VSS is similar to that in the preceding embodiment, and details are not described herein again.

It should be noted that in the above embodiments, a problem that the light-emitting module 600 is mistakenly turned on when the drive transistor M0 is self-conducting is avoided by configuring a magnitude relationship between the first reference voltage Vref1, the second reference voltage Vref2, the first power voltage VDD, and the second power voltage VSS. Such arrangement helps reduce a quantity of transistors in the pixel circuit.

Figure 18:
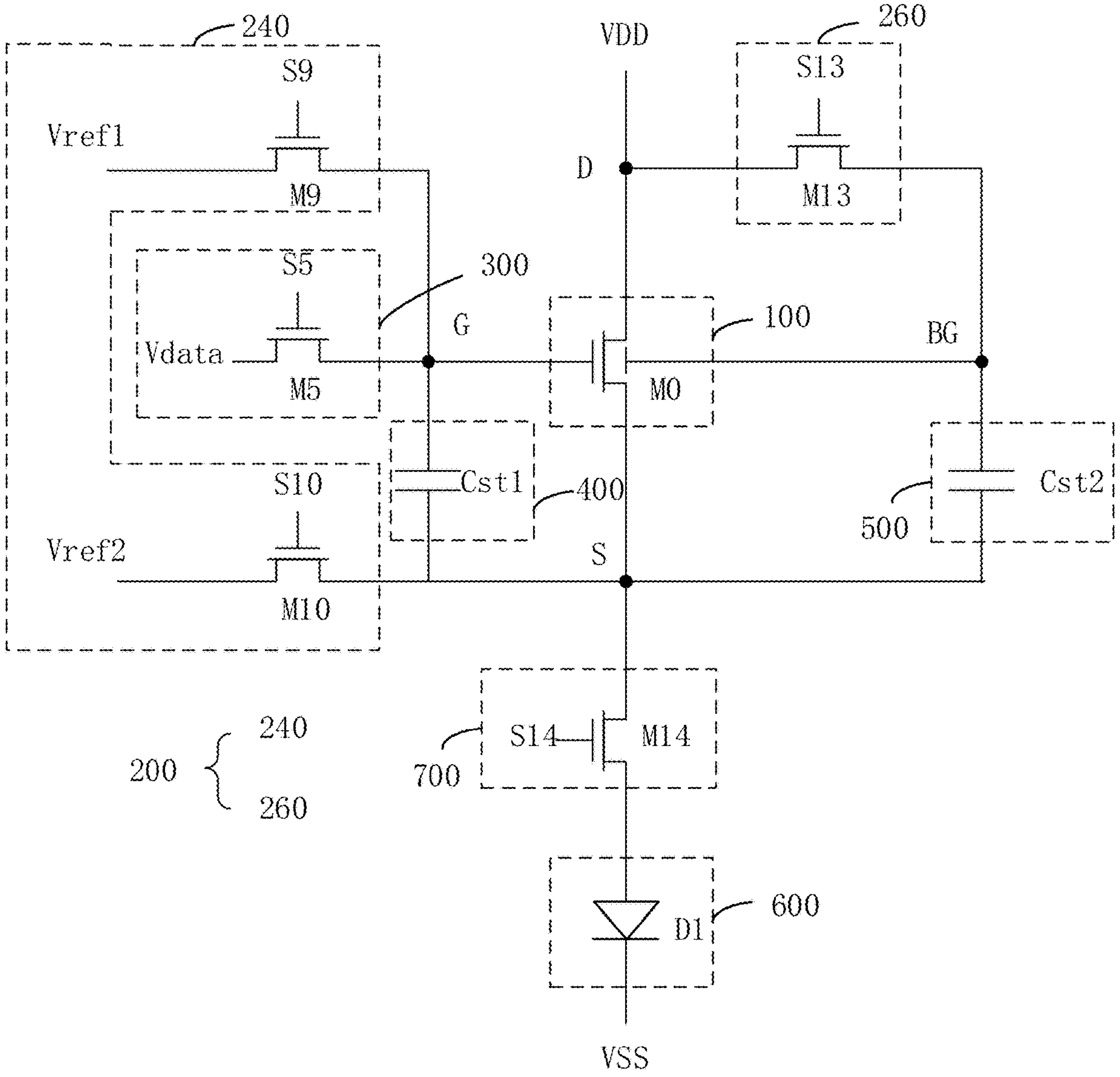
FIG. 18 is a schematic diagram of still another pixel circuit according to an embodiment of the present application.

In another embodiment shown in FIG. 18, FIG. 18 is a schematic diagram of still another pixel circuit according to an embodiment of the present application. Referring to FIG. 18, on the basis of the above embodiments, the pixel circuit further includes a light-emitting control module 700. The light-emitting control module 700 is connected between the first electrode (source S) of the drive transistor M0 and the light-emitting module 600. The light-emitting control module 700 is configured to disconnect the drive transistor M0 from the light-emitting module 600 at the threshold regulation stage, to ensure that the light-emitting module 600 is prevented from being mistakenly turned on during self-conducting of the drive transistor M0.

Still referring to FIG. 18, in an embodiment of the present application, the light-emitting control module 700 includes a fourteenth transistor M14. A gate of the fourteenth transistor M14 is connected to a fourteenth scan signal S14. A first electrode of the fourteenth transistor M14 is electrically connected to the first electrode (source S) of the drive transistor M0. A second electrode of the fourteenth transistor M14 is electrically connected to the light-emitting module 600. Such arrangement ensures that a structure of the light-emitting control module 700 is simple and easy to implement.

Figure 19:
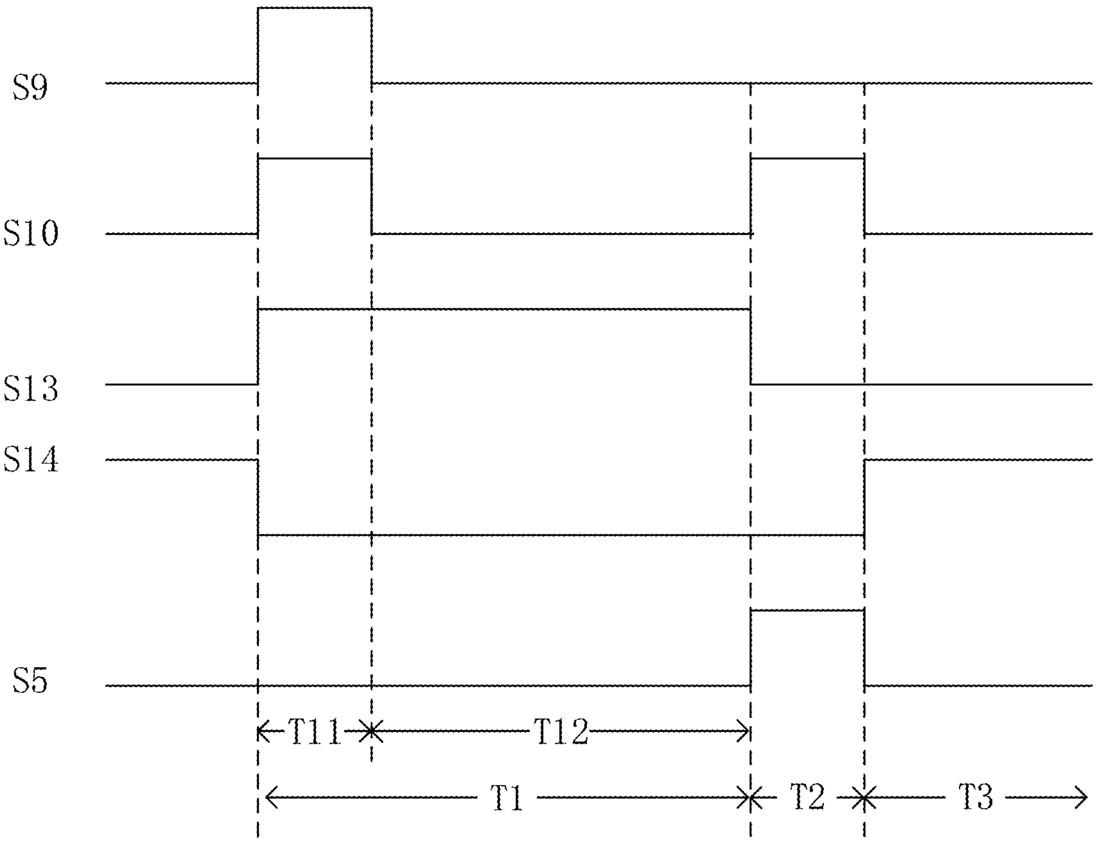
FIG. 19 is a schematic diagram of driving timing of still another pixel circuit according to an embodiment of the present application.

The driving method for a pixel circuit shown in FIG. 18 is described below with reference to driving timing. FIG. 19 is a schematic diagram of driving timing of still another pixel circuit according to an embodiment of the present application. With reference to FIG. 18 and FIG. 19, unlike the preceding embodiments, at the threshold regulation stage T1 and the data writing stage T2, the fourteenth scan signal S14 is at a low level, and the fourteenth transistor M14 is turned off under the control of the fourteenth scan signal S14, to prevent a current generated by the drive transistor M0 from flowing into the light-emitting module 600. At the light-emitting stage T3, the fourteenth scan signal S14 is at a high level, the fourteenth transistor M14 is turned on under the control of the fourteenth scan signal S14, and the drive transistor M0 generates a driving current in response to a voltage at the first gate G.

It should be noted that in the above embodiments, for example, an example in which the drive transistor M0 is an N-type transistor is used for description, and is not intended to impose a limitation on the present application. In other embodiments, the drive transistor M0 may alternatively be provided as a P-type transistor, which may be provided as required in practical application.

Figure 20:
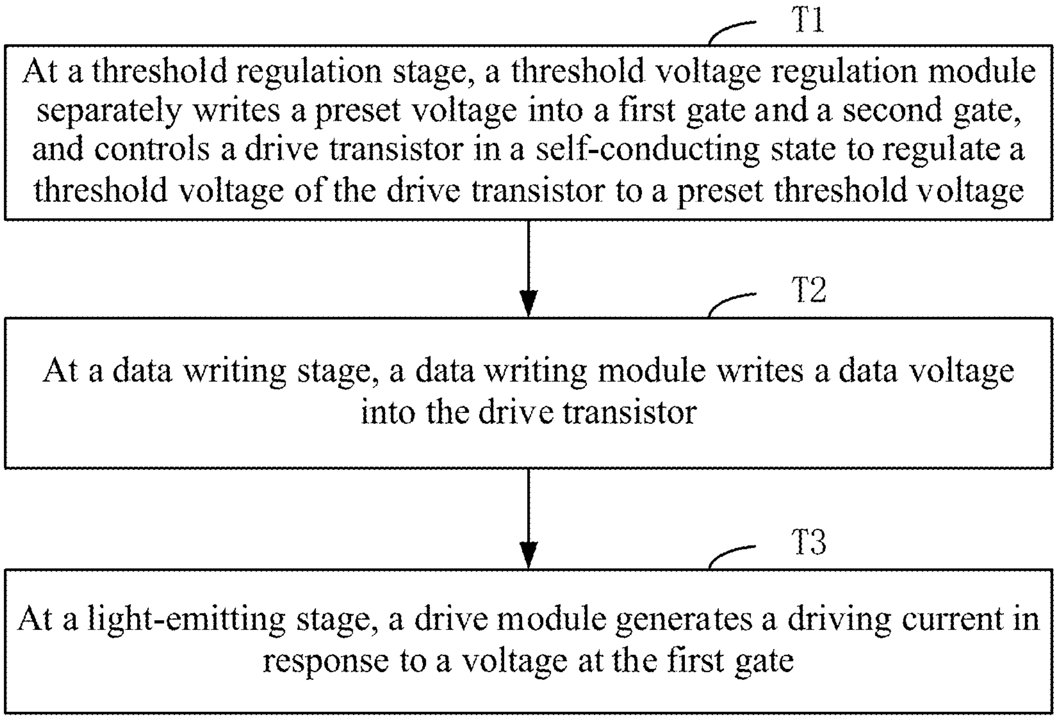
FIG. 20 is a schematic flowchart of a driving method for a pixel circuit according to an embodiment of the present application.

An embodiment of the present application further provides a driving method for a pixel circuit. The driving method is applicable to the pixel circuit according to any embodiment of the present application. FIG. 20 is a schematic flowchart of a driving method for a pixel circuit according to an embodiment of the present application. Referring to FIG. 20, the driving method includes the following steps:

T1: At a threshold regulation stage, a threshold voltage regulation module separately writes a preset voltage into a first gate and a second gate, and controls a drive transistor in a self-conducting state to regulate a threshold voltage of the drive transistor to a preset threshold voltage.

T2: At a data writing stage, a data writing module writes a data voltage into the drive transistor.

T3: At a light-emitting stage, a drive module generates a driving current in response to a voltage at the first gate.

Therefore, it can be seen that compared with simultaneous execution of the threshold compensation process and the data writing process, in this embodiment of the present application, the threshold regulation stage and the data writing stage are executed separately, which helps shorten duration of the threshold regulation stage, to help improve a refresh frequency of a high-resolution display panel. Especially for a drive transistor with metal oxide, mobility of the drive transistor is low and a compensation process takes a relatively long time. According to the driving method provided in this embodiment of the present application, a better improvement effect on the refresh frequency of the display panel is achieved.

In the embodiments of the pixel circuit, the driving methods are described for different pixel circuits. These driving methods may all be considered as the driving methods for the pixel circuit provided in the embodiments of the present application, and the repeated content is not described herein again.

An embodiment of the present application further provides a display panel, including the pixel circuit according to any embodiment of the present application. Principles thereof are similar and details are not described again.

It should be understood that the steps may be reordered, added, or deleted using the various forms of processes illustrated above. For example, the steps recorded in the present application may be performed in parallel, sequentially, or in a different order, provided that desired results of the embodiments of the present application can be achieved, which are not limited here.

What is claimed is:

1. A pixel circuit, comprising:

a drive module comprising a drive transistor, wherein the drive transistor is a dual-gate transistor and comprises a first gate and a second gate, and the drive transistor is configured to regulate a threshold voltage of the drive transistor in response to a voltage at the second gate, and generate a driving current in response to a voltage at the first gate;

a threshold voltage regulation module electrically connected to the drive module, wherein the threshold voltage regulation module is configured to separately write a preset voltage into the first gate and the second gate, and actively regulate the threshold voltage of the drive transistor to a preset threshold voltage to suppress drift of the threshold voltage;

a data writing module electrically connected to the drive module, wherein the data writing module is configured to write a data voltage into the drive transistor;

a first storage module electrically connected to the drive module, wherein the first storage module is configured to store the voltage at the first gate;

a second storage module electrically connected to the drive module, wherein the second storage module is configured to store the voltage at the second gate;

wherein the threshold voltage regulation module is configured to control the drive transistor in a self-conducting state such that the second gate discharges through the drive transistor to actively regulate the threshold voltage to the preset threshold voltage;

wherein the threshold voltage regulation module comprises a second regulation writing unit and a third regulation writing unit, wherein the second regulation writing unit is configured to write the preset threshold voltage into the drive transistor, and the third regulation writing unit is configured to write a first fixed voltage into the second gate, wherein the second regulation writing unit and the third regulation writing unit are configured such that, at a first sub-stage of a threshold regulation stage, the third regulation writing unit writes a first power voltage into the second gate to create a voltage difference between the second gate and a first electrode of the drive transistor that is greater than zero, and at a second sub-stage of the threshold regulation stage, the first power voltage is no longer written into the second gate and the second gate discharges through the self-conducting drive transistor until the voltage difference between the second gate and the first electrode of the drive transistor equals the preset threshold voltage;

wherein the active regulation of the threshold voltage to the preset threshold voltage by controlling the drive transistor in the self-conducting state improves a threshold compensation effect of the pixel circuit compared to passive compensation of the threshold voltage;

wherein the second regulation writing unit comprises:

an eleventh transistor, wherein a gate of the eleventh transistor is connected to an eleventh scan signal, a first electrode of the eleventh transistor is electrically connected to the first gate of the drive transistor, and a second electrode of the eleventh transistor is connected to a first reference voltage;

a twelfth transistor, wherein a gate of the twelfth transistor is connected to a twelfth scan signal, a first electrode of the twelfth transistor is electrically connected to the first electrode of the drive transistor, and a second electrode of the twelfth transistor is electrically connected to the first electrode of the eleventh transistor; and a fifteenth transistor, wherein a gate of the fifteenth transistor is connected to a fifth scan signal, a first electrode of the fifteenth transistor is connected to the first reference voltage, and a second electrode of the fifteenth transistor is electrically connected to the first electrode of the drive transistor; and wherein the preset threshold voltage is 0.

2. The pixel circuit according to claim 1, wherein the threshold voltage regulation module comprises:

a first initialization unit electrically connected to the first gate of the drive transistor, and the first initialization unit is configured to write a first reference voltage into the first gate;

a first regulation writing unit electrically connected to the second gate of the drive transistor, wherein the first regulation writing unit is configured to write a first fixed voltage into the second gate; and a second initialization unit electrically connected to a first electrode of the drive transistor, wherein the second initialization unit is configured to write a second reference voltage into the first electrode of the drive transistor, and a voltage difference between the first reference voltage and the second reference voltage is the preset threshold voltage.

3. The pixel circuit according to claim 2, wherein a second electrode of the drive transistor is connected to a first power voltage, and the first power voltage is reused as the first fixed voltage.

4. The pixel circuit according to claim 2, wherein the second initialization unit is arranged between the drive module and a light-emitting module.

5. The pixel circuit according to claim 4, wherein the light-emitting module is further connected to a second power voltage; the first power voltage is greater than the second reference voltage; the second reference voltage is greater than the second power voltage; and a difference between the second reference voltage and the second power voltage is less than a turn-on voltage of the light-emitting module.

6. The pixel circuit according to claim 2, wherein the first initialization unit comprises a first transistor, wherein a gate of the first transistor is connected to a first scan signal, a first electrode of the first transistor is electrically connected to the first gate, and a second electrode of the first transistor is connected to the first reference voltage;

the first regulation writing unit comprises a second transistor, wherein a gate of the second transistor is connected to a second scan signal, a first electrode of the second transistor is electrically connected to the second gate, and a second electrode of the second transistor is connected to the first fixed voltage;

the second initialization unit comprises a third transistor and a fourth transistor, wherein a gate of the third transistor is connected to a third scan signal, a first electrode of the third transistor is connected to the second reference voltage, a second electrode of the third transistor is electrically connected to a first electrode of the fourth transistor, a gate of the fourth transistor is connected to a fourth scan signal, and a second electrode of the fourth transistor is electrically connected to the first electrode of the drive transistor; and the drive transistor, the first transistor, the second transistor, the third transistor, and the fourth transistor are all N-type transistors, and the first reference voltage is greater than or equal to the second reference voltage.

7. The pixel circuit according to claim 1, wherein the data writing module is electrically connected to the first gate of the drive transistor; and the data writing module is configured to write the data voltage into the first gate.

8. The pixel circuit according to claim 7, wherein the data writing module comprises a fifth transistor, wherein a gate of the fifth transistor is connected to a fifth scan signal, a first electrode of the fifth transistor is connected to the data voltage, and a second electrode of the fifth transistor is electrically connected to the first gate of the drive transistor.

9. The pixel circuit according to claim 1, wherein the first storage module is connected between the first gate and the first electrode of the drive transistor; and the data writing module is electrically connected to the first electrode of the drive transistor, and the data writing module is configured to write the data voltage into the first storage module.

10. The pixel circuit according to claim 9, wherein the data writing module comprises a sixth transistor, wherein a gate of the sixth transistor is connected to a sixth scan signal, a first electrode of the sixth transistor is connected to the data voltage, and a second electrode of the sixth transistor is electrically connected to the first electrode of the drive transistor.

11. The pixel circuit according to claim 1, wherein the third regulation writing unit is further electrically connected to a second electrode of the drive transistor, the second electrode of the drive transistor is connected to a first power voltage, and the first power voltage is reused as the first fixed voltage.

12. The pixel circuit according to claim 1, wherein the third regulation writing unit comprises a seventh transistor, wherein a gate of the seventh transistor is connected to a seventh scan signal, a first electrode of the seventh transistor is electrically connected to the second gate, and a second electrode of the seventh transistor is electrically connected to the first fixed voltage, or a second electrode of the seventh transistor is electrically connected to the second electrode of the drive transistor; and the third regulation writing unit further comprises an eighth transistor, wherein a gate of the eighth transistor is connected to an eighth scan signal, a first electrode of the eighth transistor is electrically connected to the second electrode of the drive transistor, and a second electrode of the eighth transistor is connected to the first power voltage.

13. The pixel circuit according to claim 1, wherein the second regulation writing unit comprises:

a ninth transistor, wherein a gate of the ninth transistor is connected to a ninth scan signal, a first electrode of the ninth transistor is electrically connected to the first gate, and a second electrode of the ninth transistor is connected to a first reference voltage; and a tenth transistor, wherein a gate of the tenth transistor is connected to a tenth scan signal, a first electrode of the tenth transistor is electrically connected to the first electrode of the drive transistor, and a second electrode of the tenth transistor is connected to a second reference voltage; and a voltage difference between the first reference voltage and the second reference voltage is the preset threshold voltage; and the drive transistor, the seventh transistor, the eighth transistor, the ninth transistor, and the tenth transistor are all N-type transistors; and the first reference voltage is greater than or equal to the second reference voltage.

14. The pixel circuit according to claim 1, wherein the eleventh scan signal is reused as the twelfth scan signal.

15. The pixel circuit according to claim 1, wherein the first storage module comprises a first capacitor, wherein a first electrode of the first capacitor is electrically connected to the first gate, and a second electrode of the first capacitor is electrically connected to a first electrode of the drive transistor; and the second storage module comprises a second capacitor, wherein a first electrode of the second capacitor is electrically connected to the second gate, and a second electrode of the second capacitor is electrically connected to the first electrode of the drive transistor.

16. A method for driving a pixel circuit, using a pixel circuit according to claim 1, wherein the driving method comprises:

at a threshold regulation stage, separately writing, by the threshold voltage regulation module, a preset voltage into the first gate and the second gate, and controlling the drive transistor in a self-conducting state to regulate a threshold voltage of the drive transistor to a preset threshold voltage;

at a data writing stage, writing, by the data writing module, a data voltage into the drive transistor; and at a light emitting stage, generating, by the drive module, a driving current in response to a voltage at the first gate.

17. A display panel, comprising:

a pixel circuit, comprising:

a drive module comprising a drive transistor, wherein the drive transistor is a dual-gate transistor and comprises a first gate and a second gate, and the drive transistor is configured to regulate a threshold voltage of the drive transistor in response to a voltage at the second gate, and generate a driving current in response to a voltage at the first gate;

a threshold voltage regulation module electrically connected to the drive module, wherein the threshold voltage regulation module is configured to separately write a preset voltage into the first gate and the second gate, and actively regulate the threshold voltage of the drive transistor to a preset threshold voltage to suppress drift of the threshold voltage;

a data writing module electrically connected to the drive module, wherein the data writing module is configured to write a data voltage into the drive transistor;

a first storage module electrically connected to the drive module, wherein the first storage module is configured to store the voltage at the first gate;

a second storage module electrically connected to the drive module, wherein the second storage module is configured to store the voltage at the second gate;

wherein the threshold voltage regulation module is configured to control the drive transistor in a self-conducting state such that the second gate discharges through the drive transistor to actively regulate the threshold voltage to the preset threshold voltage;

wherein the threshold voltage regulation module comprises a second regulation writing unit and a third regulation writing unit, wherein the second regulation writing unit is configured to write the preset threshold voltage into the drive transistor, and the third regulation writing unit is configured to write a first fixed voltage into the second gate, wherein the second regulation writing unit and the third regulation writing unit are configured such that, at a first sub-stage of a threshold regulation stage, the third regulation writing unit writes a first power voltage into the second gate to create a voltage difference between the second gate and a first electrode of the drive transistor that is greater than zero, and at a second sub-stage of the threshold regulation stage, the first power voltage is no longer written into the second gate and the second gate discharges through the self-conducting drive transistor until the voltage difference between the second gate and the first electrode of the drive transistor equals the preset threshold voltage;

wherein the active regulation of the threshold voltage to the preset threshold voltage by controlling the drive transistor in the self-conducting state improves a threshold compensation effect of the pixel circuit compared to passive compensation of the threshold voltage;

wherein the second regulation writing unit comprises:

an eleventh transistor, wherein a gate of the eleventh transistor is connected to an eleventh scan signal, a first electrode of the eleventh transistor is electrically connected to the first gate of the drive transistor, and a second electrode of the eleventh transistor is connected to a first reference voltage;

a twelfth transistor, wherein a gate of the twelfth transistor is connected to a twelfth scan signal, a first electrode of the twelfth transistor is electrically connected to the first electrode of the drive transistor, and a second electrode of the twelfth transistor is electrically connected to the first electrode of the eleventh transistor; and a fifteenth transistor, wherein a gate of the fifteenth transistor is connected to a fifth scan signal, a first electrode of the fifteenth transistor is connected to the first reference voltage, and a second electrode of the fifteenth transistor is electrically connected to the first electrode of the drive transistor; and wherein the preset threshold voltage is 0.

* * * * *